(12) United States Patent
Tanida et al.

(10) Patent No.: US 8,548,042 B2
(45) Date of Patent: Oct. 1, 2013

(54) VIDEO BITRATE CONTROL METHOD, VIDEO BITRATE CONTROL APPARATUS, VIDEO BITRATE CONTROL PROGRAM, AND COMPUTER-READABLE RECORDING MEDIUM HAVING THE PROGRAM RECORDED THEREON

(75) Inventors: Ryuichi Tanida, Yokosuka (JP); Atsushi Shimizu, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 373 days.

(21) Appl. No.: 12/994,339

(22) PCT Filed: Jun. 3, 2009

(86) PCT No.: PCT/JP2009/060139
§ 371 (c)(1),
(2), (4) Date: Nov. 23, 2010

(87) PCT Pub. No.: WO2009/148076
PCT Pub. Date: Dec. 10, 2009

(65) Prior Publication Data
US 2011/0075728 A1    Mar. 31, 2011

(30) Foreign Application Priority Data
Jun. 5, 2008 (JP) .................................. 2008-147534

(51) Int. Cl.
*H04B 1/66* (2006.01)
(52) U.S. Cl.
USPC .................................................. 375/240.02
(58) Field of Classification Search
USPC .................................................... 375/240.02
See application file for complete search history.

(56) References Cited

U.S. PATENT DOCUMENTS 5,933,532 A    8/1999    Mihara 6,654,417 B1 * 11/2003 Hui .......................... 375/240.03

(Continued)

FOREIGN PATENT DOCUMENTS

| CN | 1207229 A | 2/1999 |
|----|-----------|--------|
| CN | 1354605 A | 6/2002 |

(Continued)

OTHER PUBLICATIONS

First Office Action, Chinese Patent Application No. 200980119377.6, dated Jul. 24, 2012.

(Continued)

*Primary Examiner* — Tung Vo
(74) *Attorney, Agent, or Firm* — Harness, Dickey & Pierce, P.L.C.

(57) ABSTRACT

A video bitrate control method and apparatus that control a generated bitrate of a picture to be encoded, based on an initial value of an allocation bitrate that is previously given to each picture are provided, wherein a difference between an allocation bitrate and an actually generated bitrate of a picture that has been encoded is obtained as an error bitrate, one of a maximum value and a minimum value of the allocation bitrate is selected for a plurality of subsequent pictures, as an allowable correction range, based on the sign of the error bitrate, the maximum value and the minimum value of the allocation bitrate being calculated based on the initial value of the allocation bitrate and a previously given constant, a difference between the allowable correction range and the allocation bitrate is obtained for the plurality of pictures, as an allowable variation bitrate, the ratio of the sum of allowable variation bitrates and the error bitrate is obtained as an update rate, a variation bitrate for the allocation bitrate is calculated for the plurality of pictures based on the allowable variation bitrate and the update rate, and the allocation bitrate of each of the plurality of pictures is updated based on the variation bitrate.

11 Claims, 14 Drawing Sheets

(56) References Cited

U.S. PATENT DOCUMENTS

| | | | |
|---|---|---|---|
| 6,801,572 B2* | 10/2004 | Yamada et al. | 375/240.03 |
| 6,810,083 B2* | 10/2004 | Chen et al. | 375/240.25 |
| 6,895,050 B2* | 5/2005 | Lee | 375/240.03 |
| 6,937,653 B2* | 8/2005 | Song et al. | 375/240.03 |
| 6,980,695 B2* | 12/2005 | Mehrotra | 382/244 |
| 7,027,982 B2* | 4/2006 | Chen et al. | 704/230 |
| 7,062,445 B2* | 6/2006 | Kadatch | 704/500 |
| 7,095,784 B2* | 8/2006 | Chang et al. | 375/240.03 |
| 2004/0037357 A1 | 2/2004 | Bagni et al. | |
| 2005/0089092 A1 | 4/2005 | Hashimoto et al. | |

FOREIGN PATENT DOCUMENTS

| | | |
|---|---|---|
| CN | 1434638 A | 8/2003 |
| CN | 101138249 A | 3/2008 |
| EP | 1 063 851 A2 | 12/2000 |
| EP | 1 091 588 A1 | 4/2001 |
| EP | 1 372 113 A1 | 12/2003 |
| JP | 11-252572 A | 9/1999 |
| JP | 2000-023162 A | 1/2000 |
| JP | 2000-358247 A | 12/2000 |
| JP | 2006-310912 A | 11/2006 |
| RU | 2214056 C2 | 10/2003 |
| RU | 2237370 C2 | 9/2004 |
| RU | 2004 127 121 A | 2/2006 |
| WO | 99/38333 A1 | 7/1999 |

OTHER PUBLICATIONS

Notice of Allowance of Patent, Korean Patent Application No. 10-2010-7026166, Sep. 21, 2012.

ISO/IEC JTC2/SC29/WG11: "Test Model 5", pp. 59-63, 1993.

Hiroshi Yasuda and Hiroshi Watanabe, "Basis of Digital Image Compression", Nikkei BP Publishing Center, pp. 189-193, 1999 with partial English translation thereof.

Decision on Grant, Russian Patent Application No. 2010144530, Dec. 4, 2012.

Search Report, European Patent Application No. 09758343.9, Jan. 7, 2013.

* cited by examiner

VIDEO BITRATE CONTROL METHOD, VIDEO BITRATE CONTROL APPARATUS, VIDEO BITRATE CONTROL PROGRAM, AND COMPUTER-READABLE RECORDING MEDIUM HAVING THE PROGRAM RECORDED THEREON

TECHNICAL FIELD

The present invention relates to a video bitrate control method and apparatus used in a video encoding scheme that performs a process for determining a quantization width or a similar parameter of a picture to be encoded based on a previously given allocation bitrate, a video bitrate control program used for realization of the video bitrate control method, and a computer-readable recording medium having the program recorded thereon.

Priority is claimed on Japanese Patent Application No. 2008-147534, filed Jun. 5, 2008, the content of which is incorporated herein by reference.

BACKGROUND ART

As one of methods for encoding video information at a target bitrate, there is a 2-pass encoding scheme of executing encoding once to calculate a feature of video, obtaining an allocation bitrate of each picture based thereon, and then performing encoding again, or a multi-pass encoding scheme for repeatedly performing it a plurality of times. Since these schemes are capable of appropriately distributing bitrates to respective pictures based on the result of the encoding executed once, efficient encoding can be achieved.

Even if the entire allocation bitrate of each picture is allocated based on the result of the first encoding, there is an error between an actually generated bitrate and the allocation bitrate. Accordingly, in order for a stream to come within a target size, it is necessary to incorporate an error bitrate into an allocation bitrate of a next picture to correct the errors one at a time.

A method for allocating a constant bitrate R to a plurality of pictures and incorporating an error bitrate into the constant bitrate R as cited in Non-Patent Document 1 below is widely used when CBR (constant bit rate) encoding is performed in a single pass.

On the other hand, when this CBR encoding method is applied to multi-pass encoding in which an allocation bitrate of each picture is previously determined, since the allocation bitrate of each picture is previously determined, a process for allocating a constant bitrate to a plurality of pictures is unnecessary. Accordingly, when this CBR encoding method is applied to multi-pass encoding, correction is performed by adding an error bitrate generated upon encoding of each picture to an allocation bitrate of a next picture.

FIG. 12 shows an example of a flowchart in accordance with a background art in which after an allocation bitrate and a feature of each picture have been calculated based on the result of the first encoding, the above method (a method for performing correction by adding an error bitrate generated upon encoding of each picture to an allocation bitrate of a next picture) is used.

In the background art, first, in step S501, an error bitrate and a picture number n are initialized to 0 as an initialization process, as shown in this flowchart.

In step S502, an $n^{th}$ picture is then encoded at a previously given allocation bitrate.

That is, an encoding process shown in a flowchart of FIG. 13 is executed. A quantization width is calculated from an allocation bitrate of the $n^{th}$ picture and a feature of the $n^{th}$ picture (step S601), a prediction residual is calculated (step S602), a discrete cosine transform (DCT) is applied (step S603), and a DCT coefficient is quantized (step S604). An encoded stream is then generated by variable length encoding (step S605). On the other hand, the quantized DCT coefficient is subjected to dequantization (step S606) and an inverse discrete cosine transform (IDCT) (step S607) to produce a decoded image of the prediction residual, which is added to a predicted image to generate a decoded image (step S608).

In step S503, a determination is then made as to whether or not all frames (all pictures) have been encoded, and when all the frames have been encoded, the process is terminated, and when all the frames have not been encoded, the following processes are executed.

That is, in the subsequent step S504, an error bitrate is calculated from a difference between the allocation bitrate and an actual bitrate generated upon encoding. In the subsequent step S505, the error bitrate is added to an allocation bitrate of a next picture to update the allocation bitrate of the next picture. In the subsequent step S506, a subject to be processed is shifted to the next picture, the flow returns to the process of step S502, and the above procedure is repeatedly performed.

Through the above process, the errors between the allocation bitrates and the generated bitrates are corrected one at a time, thereby an encoded stream close to a target file size can be obtained.

FIG. 14 illustrates an apparatus configuration of a conventional video encoding apparatus for executing the processes of the flowcharts shown in FIGS. 12 and 13.

As shown in FIG. 14, the conventional video encoding apparatus for executing the processes of the flowcharts shown in FIGS. 12 and 13 is provided with an allocation bitrate storage unit 101, two adders 102 and 111, two subtractors 103 and 106, a feature storage unit 104, a quantization width calculation unit 105, a DCT unit 107, a quantization unit 108, a dequantization unit 109, an IDCT unit 110, a decoded image storage buffer 112, a predicted image generation unit 113, and a variable length encoding unit 114.

The allocation bitrate storage unit 101 stores initial values of allocation bitrates of respective pictures and outputs them to the adder 102 one at a time. The adder 102 adds an initial value of an allocation bitrate output by the allocation bitrate storage unit 101 to an error bitrate output by the subtractor 103 to calculate and output an allocation bitrate of the picture to be encoded. The subtractor 103 calculates a difference between the allocation bitrate output by the adder 102 and a generated bitrate output by the variable length encoding unit 114 to calculate and output an error bitrate of a picture that has been encoded. The feature storage unit 104 stores features of the respective pictures obtained upon the first-pass encoding, and outputs them to the quantization width calculation unit 105 one at a time. The quantization width calculation unit 105 calculates and outputs a quantization width of the picture to be encoded from a feature output by the feature storage unit 104 and the allocation bitrate output by the adder 102.

The subtractor 106 calculates a difference between an input image and a predicted image output by the predicted image generation unit 113 to generate and output a prediction residual. The DCT unit 107 applies DCT to the prediction residual output by the subtractor 106. The quantization unit 108 applies quantization to each DCT coefficient output by the DCT unit 107 using the quantization width output by the quantization width calculation unit 105. The dequantization unit 109 applies dequantization to a quantization value output by the quantization unit 108 using the quantization width output by the quantization width calculation unit 105. The IDCT unit 110 applies IDCT to a dequantized coefficient output by the dequantization unit 109. The adder 111 adds a prediction residual decoded signal output by the IDCT unit 110 to the predicted image output by the predicted image generation unit 113 to generate a decoded image, and outputs it to the decoded image storage buffer 112. The decoded image storage buffer 112 stores the decoded image output by the adder 111. The predicted image generation unit 113 generates and outputs the predicted image based on the decoded image stored in the decoded image storage buffer 112. The variable length encoding unit 114 applies variable length encoding to the quantized DCT coefficient output by the quantization unit 108, and outputs an encoded stream.

The conventional video encoding apparatus executes the processes of the flowcharts shown in FIGS. 12 and 13 using the configuration as shown in FIG. 14.

It is noted that a CBR rate technique that is a basis of a method described in Non-Patent Document 1 is explained in Patent Document 1 below in which Document Name (ISO/IEC JTC/SC29/WG11: "Test Model 5", 1993) is cited. However, the invention described in this document is merely a technique within the framework of CBR even though a response to the bitrate variation is higher in comparison with the method described in Non-Patent Document 1. Accordingly, when the invention described in this document is applied to multi-pass encoding, correction is performed by adding an error bitrate generated upon encoding of each picture to an allocation bitrate of a next picture, as in the case where the method described in Non-Patent Document 1 is applied.

PRIOR ART DOCUMENTS

Patent Document

Patent Document 1: Japanese Unexamined Patent Application, First Publication No. 2000-358247

Non-Patent Document

Non-Patent Document 1: Hiroshi Yasuda and Hiroshi Watanabe, "Basis of Digital Image Compression," NIKKEI BP Publishing Center, pp. 189-193, 1999

SUMMARY OF INVENTION

Problems to be Solved by the Invention

In this way, when the CBR encoding method is applied to multi-pass encoding in which an allocation bitrate of each picture is previously determined, correction is performed by adding an error bitrate generated upon encoding of each picture to an allocation bitrate of a next picture, as explained in the flowcharts shown in FIGS. 12 and 13.

However, in accordance with such a method, an error bitrate of a previous picture is settled in the next picture, and thus there is a problem in that the variation from a previously obtained allocation bitrate increases.

In particular, when an operation at a variable bitrate (VBR) in which an allocation bitrate greatly varies within a sequence is assumed, allocation bitrates, originally, are greatly different from picture to picture. Accordingly, when an error bitrate generated in a previous picture is added to an allocation bitrate of a next picture, a variation from the original allocation bitrate increases and there is a high risk that image quality between pictures greatly fluctuates.

The present invention has been achieved in view of the above circumstances, and it is an object of the present invention to provide a novel video bitrate control technique for realizing an improvement in subjective image quality by reducing the image quality variation between pictures when encoding of video at a target bitrate is realized.

Means for Solving the Problems

In order to achieve this object, the present invention is a video bitrate control method that controls a generated bitrate of a picture to be encoded based on an initial value of an allocation bitrate that is previously given to each picture, the method comprising: a step of obtaining a difference between an allocation bitrate and an actually generated bitrate of a picture that has been encoded, as an error bitrate; a step of selecting, for a plurality of subsequent pictures, one of a maximum value and a minimum value of the allocation bitrate, as an allowable correction range, based on the sign of the error bitrate, the maximum value and the minimum value of the allocation bitrate being calculated from the initial value of the allocation bitrate and a previously given constant; a step of obtaining, for the plurality of pictures, a difference between the allowable correction range and the allocation bitrate, as an allowable variation bitrate; a step of obtaining the ratio of the sum of allowable variation bitrates and the error bitrate, as an update rate; and a step of calculating, for the plurality of pictures, a variation bitrate for the allocation bitrate based on the allowable variation bitrate and the update rate, and updating the allocation bitrate of each of the plurality of pictures based on the variation bitrate.

Preferably, the video bitrate control method of the present invention comprises a step of obtaining, for each picture, the maximum value and the minimum value of the allocation bitrate based on the initial value of the allocation bitrate and the constant in advance.

Preferably, in the video bitrate control method of the present invention, the selecting step selects the maximum value of the allocation bitrate as the allowable correction range when the allocation bitrate is greater than the actually generated bitrate and the error bitrate indicates a positive value, and selects the minimum value of the allocation bitrate as the allowable correction range when the allocation bitrate is less than the actually generated bitrate and the error bitrate indicates a negative value.

Preferably, the video bitrate control method of the present invention comprises: a step of clipping the update rate to be in a given range; a step of obtaining a difference between the error bitrate and the sum of variation bitrates, as a carry-over bitrate; and a step of adding the carry-over bitrate to the error bitrate obtained upon encoding of a next picture.

Preferably, in the video bitrate control method of the present invention, the update rate is common to the plurality of pictures.

In addition, the present invention is a video bitrate control apparatus that controls a generated bitrate of a picture to be encoded based on an initial value of an allocation bitrate that is previously given to each picture, the apparatus comprising: a means for obtaining a difference between an allocation bitrate and an actually generated bitrate of a picture that has been encoded, as an error bitrate; a means for selecting, for a plurality of subsequent pictures, one of a maximum value and a minimum value of the allocation bitrate, as an allowable correction range, based on the sign of the error bitrate, the maximum value and the minimum value of the allocation bitrate being calculated from the initial value of the allocation bitrate and a previously given constant; a means for obtaining, for the plurality of pictures, a difference between the allowable correction range and the allocation bitrate, as an allowable variation bitrate; a means for obtaining the ratio of the sum of allowable variation bitrates and the error bitrate, as an update rate; and a means for calculating, for the plurality of pictures, a variation bitrate for the allocation bitrate based on the allowable variation bitrate and the update rate, and updating the allocation bitrate of each of the plurality of pictures based on the variation bitrate.

Preferably, the video bitrate control apparatus of the present invention comprises a means for obtaining, for each picture, the maximum value and the minimum value of the allocation bitrate based on the initial value of the allocation bitrate and the constant in advance.

Preferably, in the video bitrate control apparatus of the present invention, the selecting means selects the maximum value of the allocation bitrate as the allowable correction range when the allocation bitrate is greater than the actually generated bitrate and the error bitrate indicates a positive value, and selects the minimum value of the allocation bitrate as the allowable correction range when the allocation bitrate is less than the actually generated bitrate and the error bitrate indicates a negative value.

Preferably, the video bitrate control apparatus of the present invention comprises: a means for clipping the update rate to be in a given range; a means for obtaining a difference between the error bitrate and the sum of variation bitrates as a carry-over bitrate; and a means for adding the carry-over bitrate to the error bitrate obtained upon encoding of a next picture.

Preferably, in the video bitrate control apparatus of the present invention, the update rate is common to the plurality of pictures.

Moreover, the present invention is a video bitrate control program for causing a computer to execute the video bitrate control method of the present invention.

Furthermore, the present invention is a computer-readable recording medium having a video bitrate control program recorded thereon for causing a computer to execute the video bitrate control method of the present invention.

Advantageous Effects of Invention

In accordance with the present invention, the allowable variation bitrates of a plurality of predetermined pictures are obtained based on the allowable correction ranges of the allocation bitrates determined from the sizes of the initial values of the allocation bitrates of the respective pictures, the update rate is obtained from the ratio of the sum of the allowable variation bitrates and the error bitrate, the variation bitrates allocated to the respective pictures are obtained based on the allowable variation bitrates of the respective pictures and the update rate, and the error bitrate is allocated to allocation bitrates of a plurality of subsequent pictures in accordance with the variation bitrates.

Accordingly, the error bitrate generated in the encoded picture is distributed to the next picture as well as a plurality of pictures, thereby suppressing the variation of the allocation bitrate of the next picture and thus reducing the image quality variation between pictures.

In addition, since the maximum values and the minimum values of the allocation bitrates are not fixed but are determined from the previously given initial values of the allocation bitrates, and the distribution amounts (variation bitrates) is determined based thereon, fluctuation of the quantization width due to the correction of the error bitrate is in a constant range even when the variation of the allocation bitrate between the pictures is great like VBR.

Moreover, since the distribution amounts (variation bitrates) are obtained based on the update rate common to the allowable variation bitrates of the respective pictures, the quantization widths of the respective pictures are equally changed, and image quality fluctuation between the pictures due to the present process is kept to be small.

Furthermore, since there is a mechanism for carrying over an error bitrate that could not be distributed, it is possible to continuously perform control without failure even when the control is likely to fail with the conventional method. In addition, since a clipping process for realizing this mechanism is performed only on an update rate, processing can be performed only with one conditional branch.

MODE FOR CARRYING OUT THE INVENTION

Figure 1A:
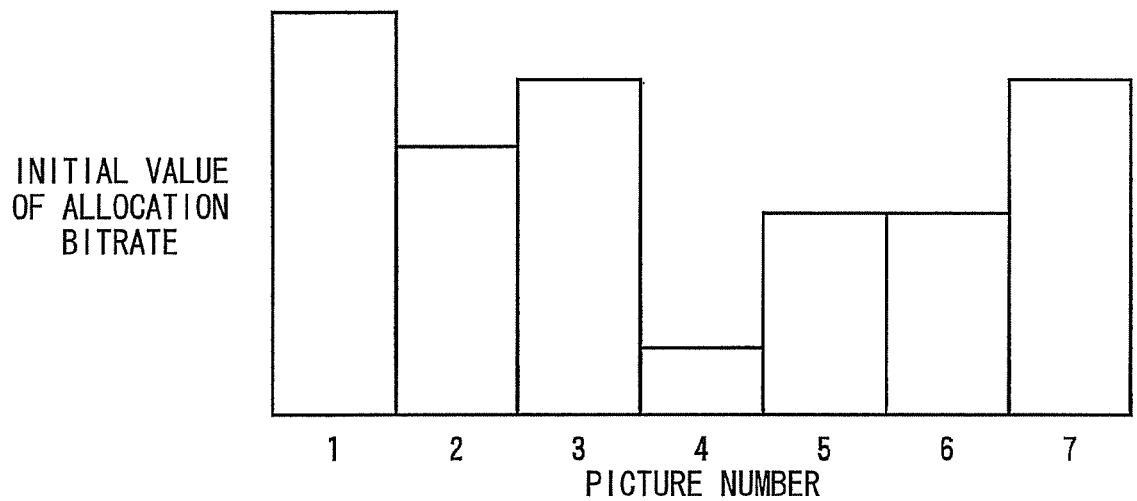
FIG. 1A is an explanatory diagram showing a process in a video bitrate control apparatus to which the present invention is applied.

Hereinafter, the present invention will be described in detail in accordance with embodiments.

First, a basic principle of a video bitrate control apparatus to which the present invention is applied will be described before describing the embodiments of the present invention.

[1] Configuration of Video Bitrate Control Apparatus

When this video bitrate control apparatus adopts a configuration for controlling a generated bitrate of a picture to be encoded, based on an initial value of an allocation bitrate given to each picture in advance, the video bitrate control apparatus is provided with (1) a first calculating means for obtaining a difference between an allocation bitrate and an actually generated bitrate of a picture that has been encoded, as an error bitrate, (2) a selecting means for selecting, for a plurality of subsequent pictures, one of a maximum value and a minimum value of the allocation bitrate that are calculated from the initial value of the allocation bitrate and a previously given constant, as an allowable correction range, based on the sign of the error bitrate obtained by the first calculating means, (3) a second calculating means for obtaining, for the plurality of subsequent pictures, a difference between the allowable correction range selected by the selecting means and the allocation bitrate, as allowable variation bitrates, (4) a third calculating means for calculating the sum of the allowable variation bitrates obtained by the second calculating means and obtaining the ratio of the calculated sum of the allowable variation bitrates and the error bitrate obtained by the first calculating means, as an update rate, and (5) an updating means for calculating, for the plurality of subsequent pictures, variation bitrates corresponding to allocation bitrates based on the allowable variation bitrates obtained by the second calculating means and the update rate obtained by the third calculating means, and updating the allocation bitrates of the plurality of pictures based on the calculated variation bitrates.

Here, the maximum value and the minimum value of the allocation bitrate that may be selected by the selecting means may not be obtained each time the error bitrate is obtained by the first calculating means, but "a fourth calculating means for obtaining, for each picture, the maximum value and the minimum value of the allocation bitrate based on the initial value of the allocation bitrate and the previously given constant in advance" may be provided, and the selecting means may read a corresponding one among those obtained by the fourth calculating means.

For example, this fourth calculating means may obtain the maximum value of the allocation bitrate by multiplying the initial value of the allocation bitrate by a constant and the minimum value of the allocation bitrate by dividing the initial value of the allocation bitrate by a constant, or may obtain the maximum value of the allocation bitrate by adding a constant to the initial value of the allocation bitrate and the minimum value of the allocation bitrate by subtracting a constant from the initial value of the allocation bitrate.

When this configuration is adopted, (6) a clipping means for clipping the update rate obtained by the third calculating means to be in a given range, (7) a fifth calculating means for calculating the sum of variation bitrates calculated by the updating means and obtaining a difference between the error bitrate obtained by the first calculating means and the sum, as a carry-over bitrate, and (8) an adding means for adding the carry-over bitrate (which may indicate a negative value) obtained by the fifth calculating means to the error bitrate obtained upon encoding of the next picture may be further provided.

Furthermore, the selecting means selects the maximum value of the allocation bitrate as the allowable correction range when the error bitrate indicates a positive value (when the allocation bitrate is greater than the actually generated bitrate), and selects the minimum value of the allocation bitrate as the allowable correction range when the error bitrate indicates a negative value (when the allocation bitrate is less than the actually generated bitrate). It is note that the case where the error bitrate is 0 may be handled as in the case where the error bitrate indicates the positive value, or it may be handled as in the case where the error bitrate indicates the negative value.

The video bitrate control method realized by the operations in the above respective processing means may also be realized by a computer program. This computer program is recorded on an appropriate computer-readable recording medium and provided or provided via a network, installed when this video bitrate control method is performed, and operated on a control means such as a central processing unit (CPU), thus realizing this video bitrate control method.

[2] Example of Process in the Video Bitrate Control Apparatus

Hereinafter, an example of the process in this video bitrate control apparatus will be described using a specific example of a process executed when the fourth calculating means is provided.

Figure 1B:
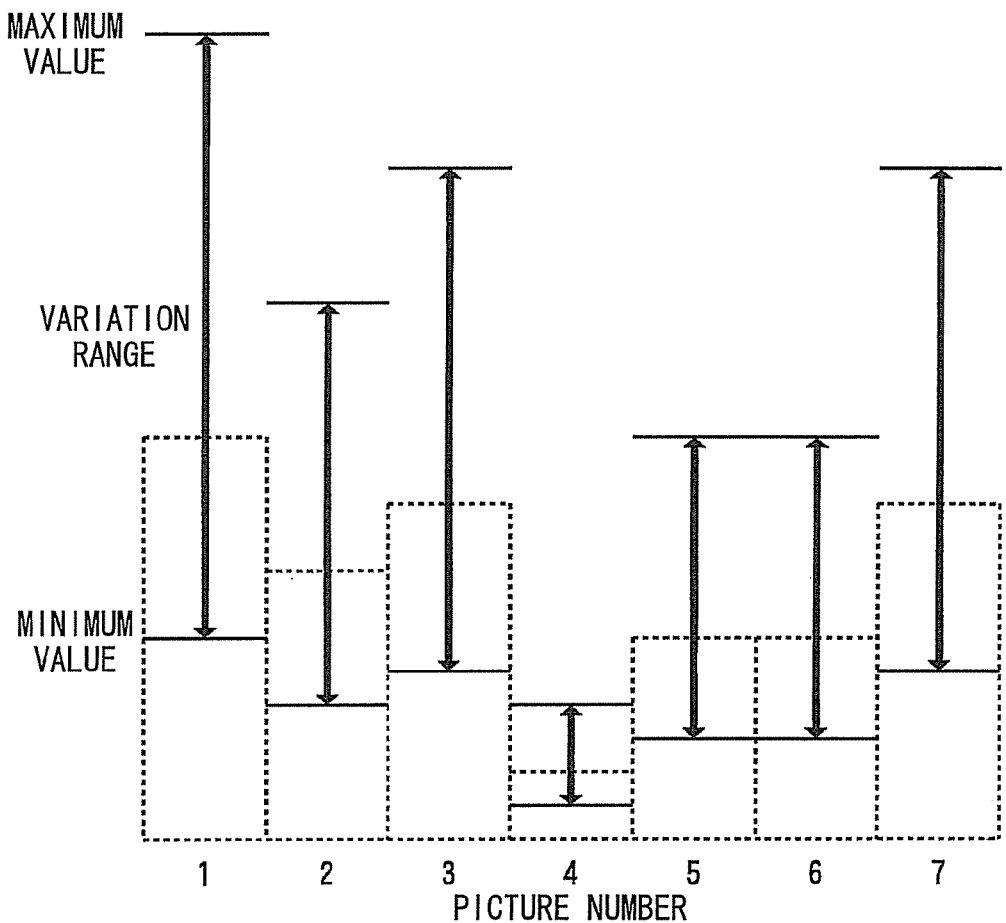
FIG. 1B is an explanatory diagram showing a process in a video bitrate control apparatus to which the present invention is applied.

In the video bitrate control apparatus thus configured, an initial value of an allocation bitrate is determined for each picture to be encoded, as shown in FIG. 1A, based on a certain pre-analysis such as the first encoding. For example, the initial value of the allocation bitrate multiplied by a constant is set as a maximum value of the allocation bitrate, and the initial value of the allocation bitrate divided by a constant is set as a minimum value of the allocation bitrate. Accordingly, a variation range of the allocation bitrate (from the maximum value to the minimum value) is determined for each picture to be encoded, as shown in FIG. 1B.

Since the determined variation range of the allocation bitrate is determined from the initial value of the allocation bitrate, the variation range is invariant in an encoding process.

Thereafter, the encoding process is started, and a difference between an allocation bitrate and an actually generated bitrate of a picture that has been encoded is obtained as an error bitrate.

In the background art, the error bitrate obtained at this time is settled by adding it to an allocation bitrate of a next picture, but this method causes the variation from the previously obtained allocation bitrate to increase.

Figure 2:
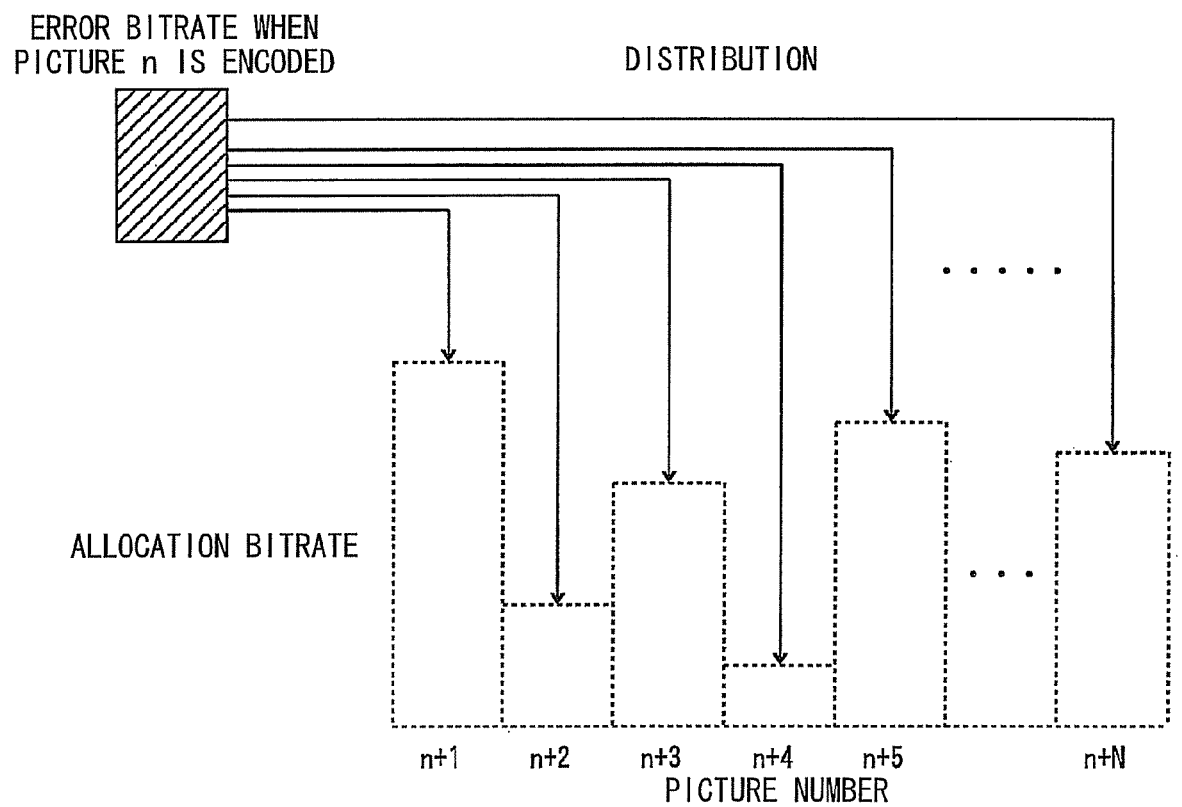
FIG. 2 is an explanatory diagram showing a process in a video bitrate control apparatus to which the present invention is applied.

Thus, this video bitrate control apparatus adopts a configuration for distributing the error bitrate obtained at this time to N pictures to be encoded subsequently, as shown in FIG. 2.

In this case, it is not preferable to use a method for equally dividing the error bitrate by N for uniform distribution. Since a picture with a high allocation bitrate essentially requires a high bitrate and a picture with a low allocation bitrate does not essentially require such a bitrate, it is not preferable to use the method for equally dividing the error bitrate by N for uniform distribution.

Thus, in this video bitrate control apparatus, a margin from an allocation limit is obtained for each of subsequent N pictures, a bitrate is obtained by multiplying the margin by a constant update rate, and the bitrate thus obtained is distributed to the respective N pictures. In this case, the update rate is determined based on the fact that the sum of the bitrates distributed to the subsequent N pictures is equal to the error bitrate.

That is, this video bitrate control apparatus obtains a difference between the allocation bitrate and the actually generated bitrate of a picture that has been encoded, as an error bitrate. Based on the sign of the error bitrate, when the error bitrate indicates a positive value, this video bitrate control apparatus selects a maximum value of the allocation bitrate obtained prior to starting the encoding, as an allowable correction range, in order to allocate the error bitrate in a manner of adding the error bitrate to allocation bitrates of a plurality of subsequent pictures. On the other hand, when the error bitrate indicates a negative value, this video bitrate control apparatus selects a minimum value of the allocation bitrate obtained prior to starting the encoding, as the allowable correction range, in order to allocate the error bitrate in a manner of subtracting the error bitrate from the allocation bitrates of the plurality of subsequent pictures.

It is noted that when the fourth calculating means is not provided, if the error bitrate indicates a positive value at a time when this allowable correction range is selected, the maximum values of the allocation bitrates are obtained for the plurality of subsequent pictures, for example, by multiplying the initial values of the allocation bitrates by a constant and the maximum values are selected as allowable correction ranges. On the other hand, if the error bitrate indicates a negative value, the minimum values of the allocation bitrates are obtained for the plurality of subsequent pictures, for example, by dividing the initial values of the allocation bitrates by a constant, and the minimum values are selected as allowable correction ranges.

Differences between the allowable correction ranges and the allocation bitrates are then obtained for the plurality of subsequent pictures as allowable variation bitrates, and the ratio of the sum of the thus obtained allowable variation bitrates and the error bitrate is obtained as an update rate.

Variation bitrates for the allocation bitrate of the plurality of subsequent pictures are then calculated based on the allowable variation bitrates and the update rate, and the allocation bitrates of the respective pictures are updated based thereon.

For example, when an initial value of an allocation bitrate of a subsequent picture is 50, assuming that the initial value of the allocation bitrate multiplied by 2 is set as the maximum value of the allocation bitrate and the initial value of the allocation bitrate divided by 2 is set as the minimum value of the allocation bitrate, the maximum value of the allocation bitrate is 100 and the minimum value of the allocation bitrate is 25.

In this case, when the current allocation bitrate of the picture is 70 and the update rate is 20%, if the error bitrate is positive, the allowable variation bitrate is 30 (=100−70) upward, and if the error bitrate is negative, the allowable variation bitrate is 45 (=70−25) downward. Therefore, if the error bitrate is positive, the allocation bitrate of the picture is updated to "76 (=70+30×0.2)," and if the error bitrate is negative, the allocation bitrate of the picture is updated to "61 (=70−45×0.2)."

Here, when the allowable variation bitrate of picture j is indicated by Tm[j], the error bitrate is indicated by D, and the update rate is indicated by K, the update rate K is obtained as the ratio of the sum $\Sigma Tm[j]$ of the allowable variation bitrates of the subsequent N pictures and the error bitrate D:

$K=D/\Sigma Tm[j]$.

Based on this update rate K, the variation bitrate Td[j] of the picture j is obtained by:

$Td[j]=K \times Tm[j]$

Accordingly, the sum of the variation bitrates Td[j] of the subsequent N pictures is expressed by:

$\Sigma Td[j]=\Sigma K \times Tm[j]=K \times \Sigma Tm[j]=(D/\Sigma Tm[j]) \times \Sigma Tm[j]=D$.

As seen from this, this video bitrate control apparatus determines the update rate K based on the fact that the sum of variation bitrates Td[j] distributed to the subsequent N pictures is equal to the error bitrate D.

In this way, this video bitrate control apparatus obtains the error bitrate based on the difference between the allocation bitrate and the actually generated bitrate of the picture that has been encoded, and, instead of settling this error bitrate by adding it to the allocation bitrate of the next picture, settles it by distributing the error bitrate to a plurality of pictures to be encoded subsequently depending on a need for the pictures.

In accordance with this configuration, when realizing encoding of video at a target bitrate, this video bitrate control apparatus can reduce the image quality variation between pictures and can realize an improvement in subjective image quality.

When this configuration is adopted, if the allocation bitrates are accumulated (drawn) to an allocation limit, the allocation bitrates are no longer accumulated (drawn) and thus the error bitrate cannot be distributed.

Thus, in this video bitrate control apparatus, a difference is generated between the error bitrate and the sum of the variation bitrates by clipping the update rate to be in a given range, and the thus generated difference is added as a carry-over bitrate to the error bitrate obtained upon encoding of the next picture.

Figure 3:
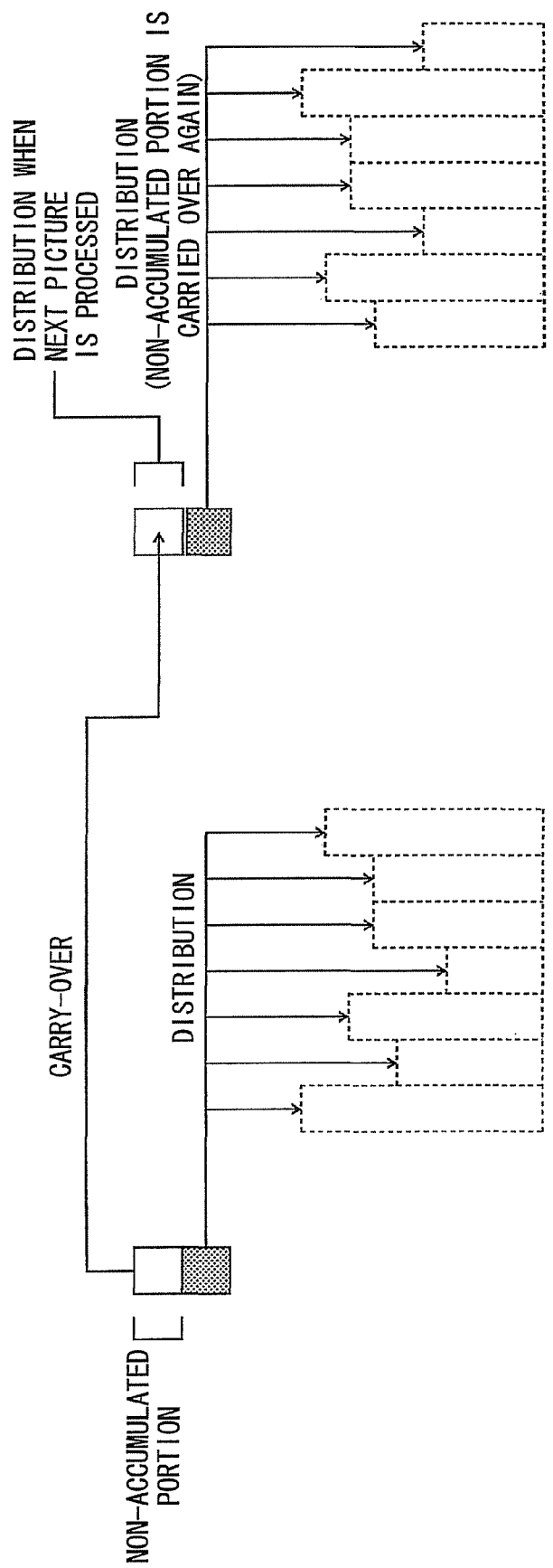
FIG. 3 is an explanatory diagram showing a process in a video bitrate control apparatus to which the present invention is applied.

That is, as shown in FIG. 3, the non-accumulated portion (the non-drawn portion) is distributed when the next picture is processed.

Next, an embodiment of the present invention based on the above-described basic principle will be described.

Figure 4:
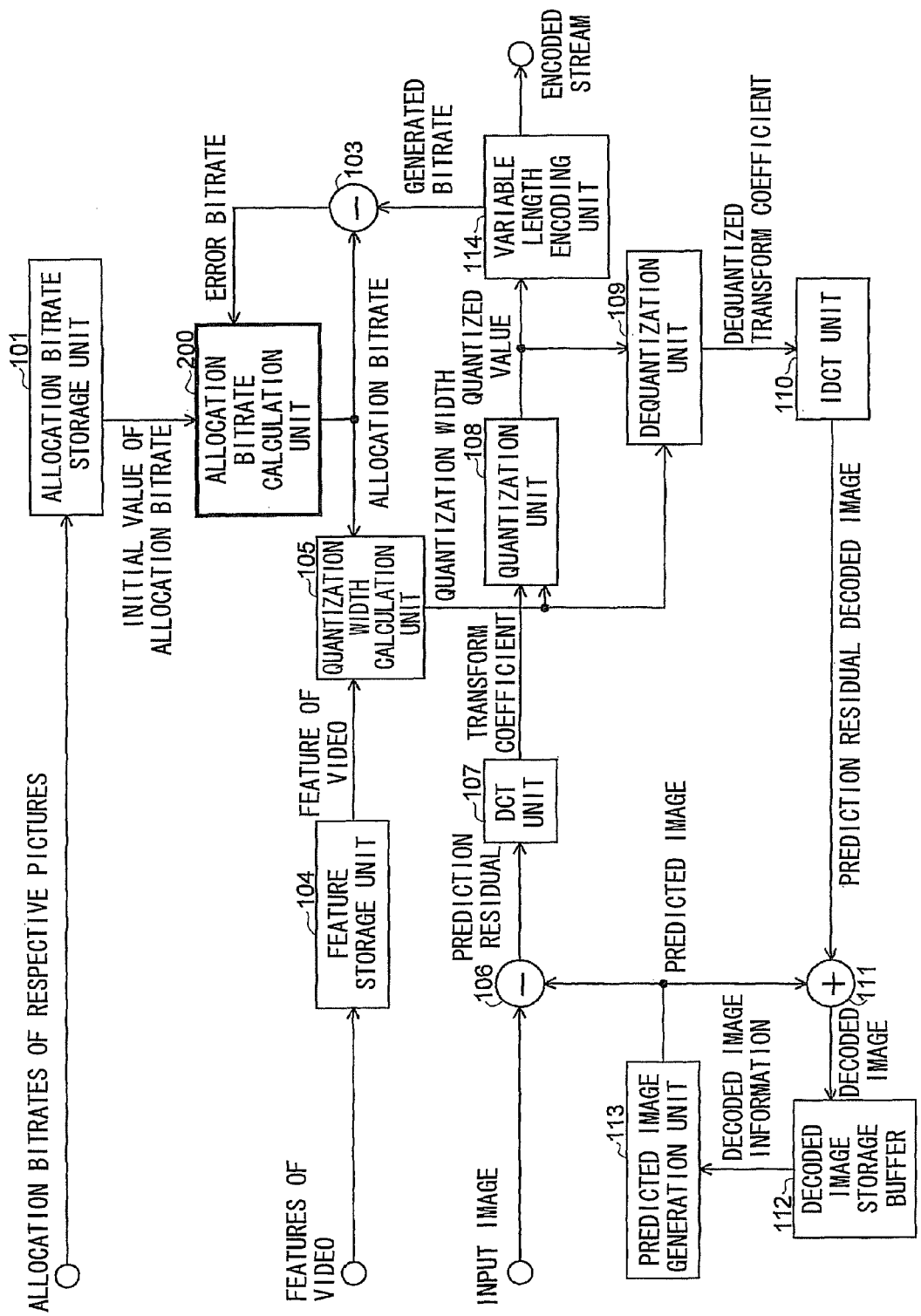
FIG. 4 is a diagram showing an example of an apparatus configuration of a video encoding apparatus including a video bitrate control apparatus to which the present invention is applied.

FIG. 4 illustrates an example of an apparatus configuration of a video encoding apparatus which is provided with a video bitrate control apparatus to which the present invention is applied.

Figure 14:
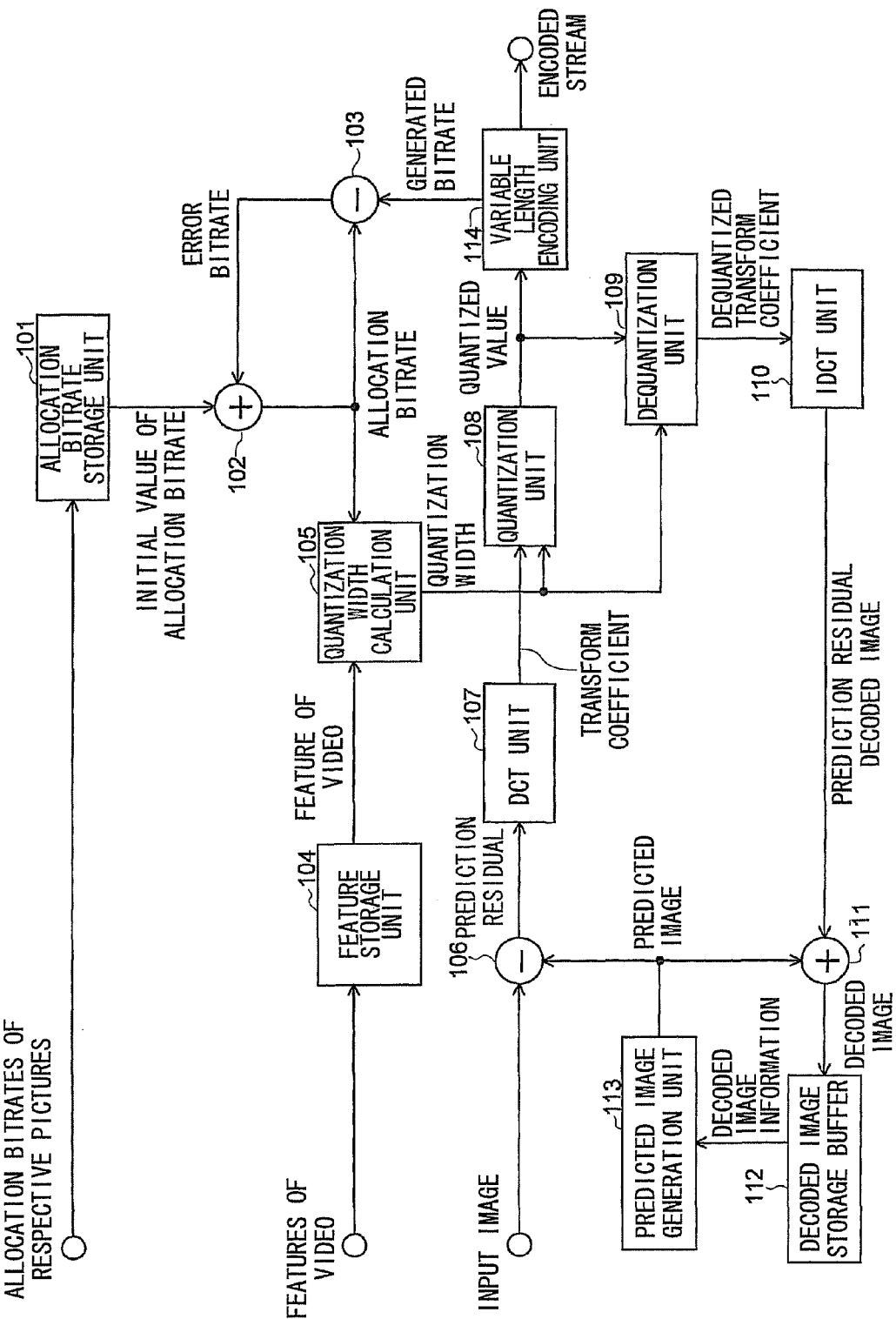
FIG. 14 is a diagram of a configuration of an apparatus in accordance with a background art.

As shown in FIG. 4, this video encoding apparatus is provided with an allocation bitrate storage unit 101, a subtractor 103, a feature storage unit 104, a quantization width calculation unit 105, a subtractor 106, a DCT unit 107, a quantization unit 108, a dequantization unit 109, an IDCT unit 110, an adder 111, a decoded image storage buffer 112, a predicted image generation unit 113, and a variable length encoding unit 114 that have the same functions as those shown in FIG. 14. In addition to these, this video encoding apparatus is provided with an allocation bitrate calculation unit 200 that executes a process that is characteristic of the present embodiment. The video bitrate control apparatus is configured by including the allocation bitrate calculation unit 200 and the subtractor 103.

Figure 5:
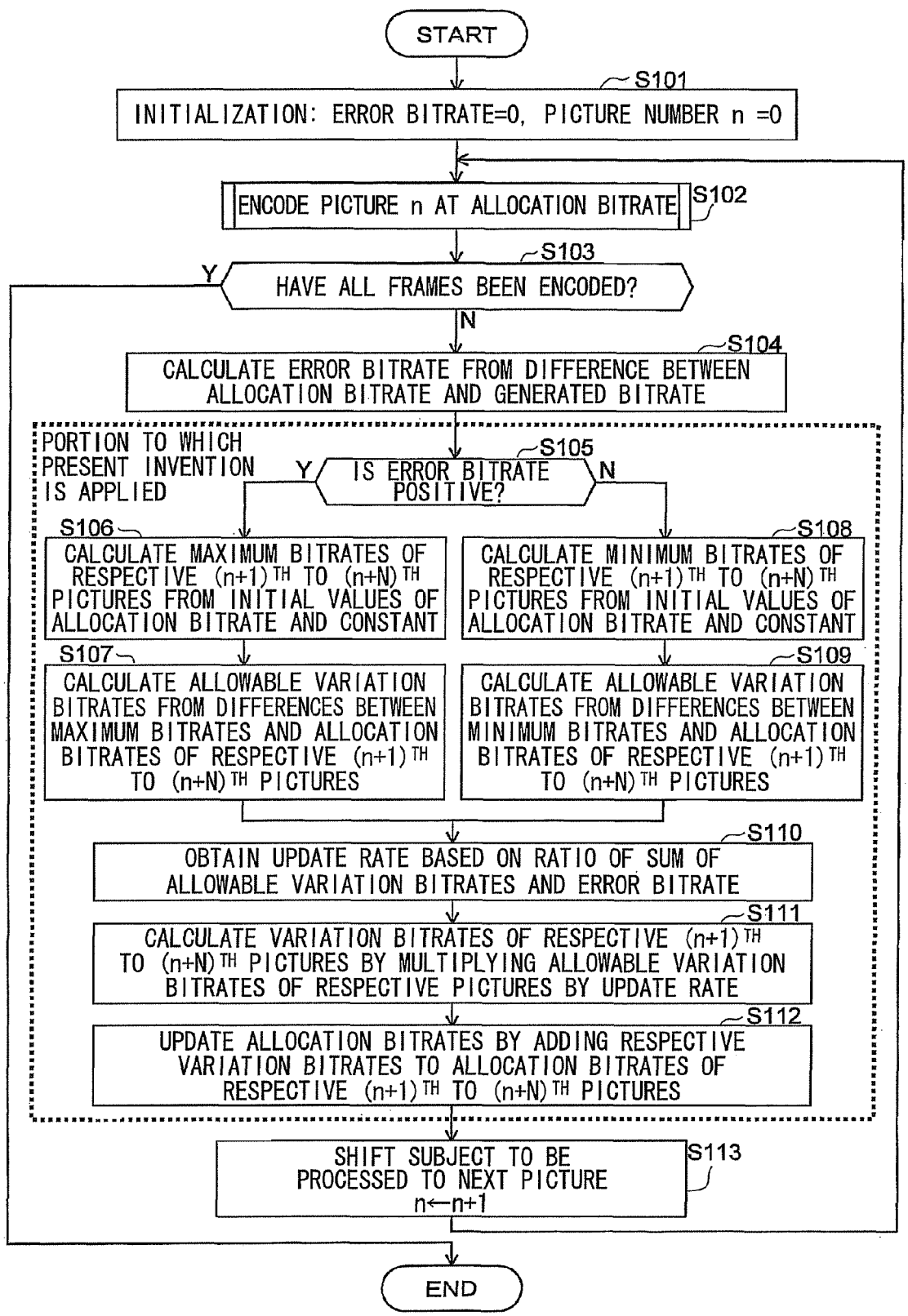
FIG. 5 is a flowchart executed by an allocation bitrate calculation unit.
Figure 12:
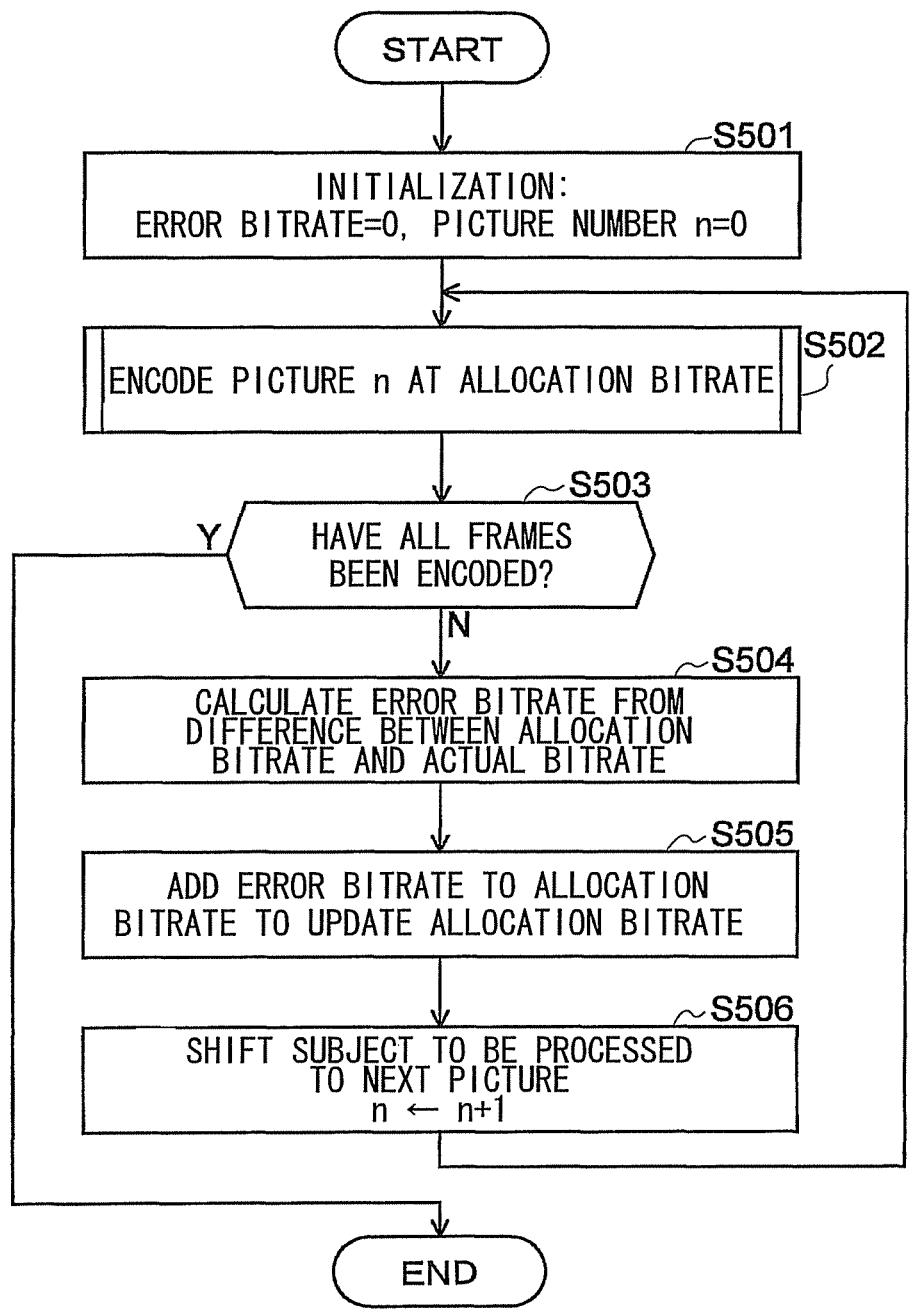
FIG. 12 is a flowchart in accordance with a background art.
Figure 13:
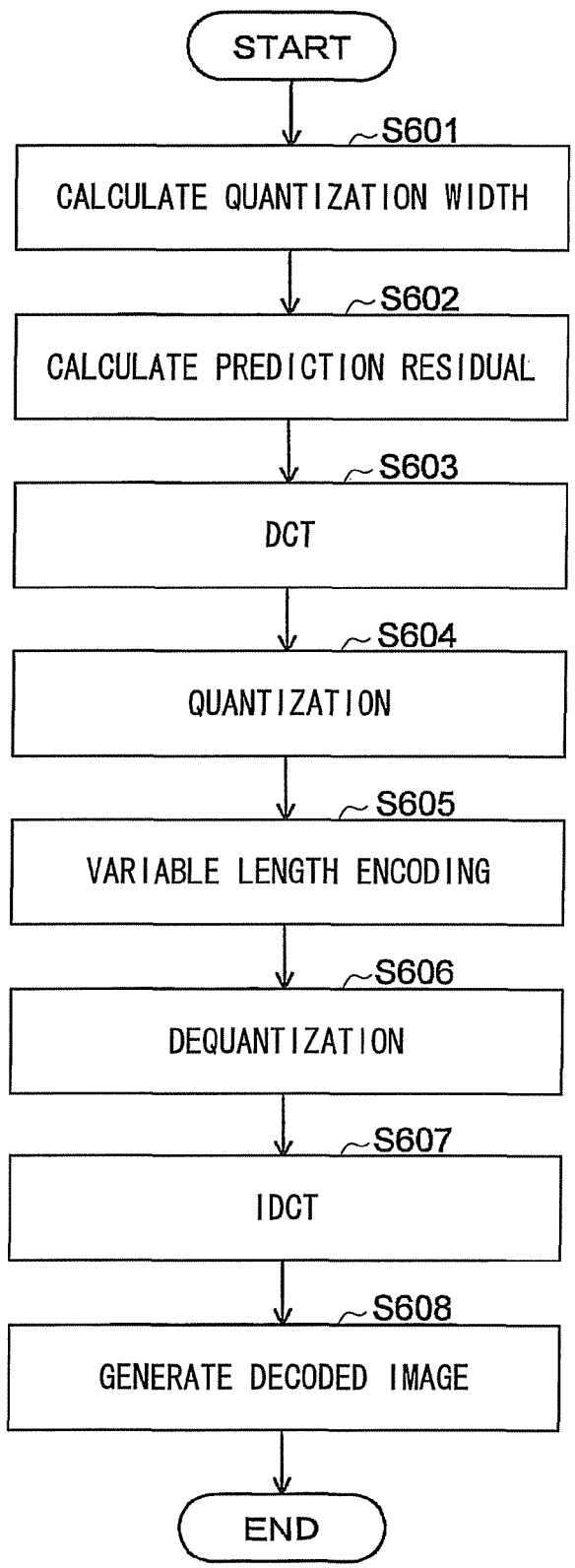
FIG. 13 is a flowchart of a picture encoding process.

FIG. 5 shows an example of a flowchart of the process executed by the allocation bitrate calculation unit 200 that is characteristic of the present embodiment. Here, the present invention is applied to a portion surrounded by a dotted line, compared to the flowchart of the conventional method shown in FIG. 12.

When a process is initiated, in step S101, the video encoding apparatus first initializes an error bitrate and a picture number n to 0 as an initialization process.

In step S102, an $n^{th}$ picture is then encoded at a previously given allocation bitrate. Here, it is assumed that an initial value of the allocation bitrate of each picture is preset based on the result of the first encoding.

In step S103, a determination is then made as to whether or not all frames (all pictures) have been encoded, and when all the frames have been encoded, the process is terminated, and when all the frames have not been encoded, the following processes are executed.

That is, in step S104, an error bitrate is calculated from a difference between an allocation bitrate and a generated bitrate for an $n^{th}$ picture, and, in subsequent step S105, whether the sign of the calculated error bitrate is positive or negative is determined.

If it is determined that the error bitrate calculated in step S104 is positive in accordance with the determination process of step S105, the flow proceeds to step S106, and maximum bitrates (the above-described maximum value of the allocation bitrate) of the $(n+1)^{th}$ to $(n+N)^{th}$ pictures (N is a predetermined constant greater than 1) are calculated from the initial values of the allocation bitrates of the respective pictures and a constant.

In step S107, allowable variation bitrates of the $(n+1)^{th}$ and $(n+N)^{th}$ pictures are then calculated from the differences between the maximum bitrates and the allocation bitrates of these respective pictures.

On the other hand, if it is determined that the error bitrate calculated in step S104 is negative in accordance with the determination process of step S105, the flow proceeds to step S108, and minimum bitrates (the above-described minimum value of the allocation bitrate) of the $(n+1)^{th}$ to $(n+N)^{th}$ pictures (N is a predetermined constant greater than 1) are calculated from the initial values of the allocation bitrates of the respective pictures and a constant.

In step S109, allowable variation bitrates of the $(n+1)^{th}$ to $(n+N)^{th}$ pictures are then calculated from the differences between the minimum bitrates and the allocation bitrates of these respective pictures.

In this way, after the allowable variation bitrates of the $(n+1)^{th}$ to $(n+N)^{th}$ pictures have been calculated in steps S107 and 109, in step S110, the sum of the calculated allowable variation bitrates is then obtained and an update rate is obtained from the ratio of the sum of the allowable variation bitrates and the error bitrate.

In step S111, variation bitrates of the $(n+1)^{th}$ and $(n+N)^{th}$ pictures are then obtained by multiplying the allowable variation bitrate of these respective pictures by the obtained update rate.

In step S112, the allocation bitrates of the $(n+1)^{th}$ to $(n+N)^{th}$ pictures are then updated by adding the obtained variation bitrates to the allocation bitrates of the respective pictures. It is noted that the initial values of the allocation bitrates of the respective pictures are preset based on the result of the first encoding, but not updated.

In step S113, a subject to be processed is then shifted to a next picture, the flow returns to the process of step S102, and the above-described processes is repeatedly performed.

In accordance with the present embodiment, through the above processes, the error bitrate generated in the encoded picture is distributed to the next picture as well as a plurality of pictures, thereby suppressing the variation of the allocation bitrate of the next picture.

Since the maximum values and the minimum values of the allocation bitrates are not fixed but are determined from the previously given initial values of the allocation bitrates, and the distribution amount is determined based thereon, fluctuation of the quantization width due to the correction of the error bitrate can be in a certain range even when the variation of the allocation bitrate between the pictures is large like VBR.

Since the distribution amount is obtained by multiplying the common update rate by the allowable variation bitrate of each picture, the quantization widths of the respective pictures are equally changed, thereby keeping fluctuation of image quality between pictures due to the present process to be small.

Here, in the flowchart of FIG. 5, the maximum bitrates are calculated in step S106 and the minimum bitrates are calculated in step S108. However, since the maximum bitrates and the minimum bitrates are calculated from the initial values of the allocation bitrates of the respective pictures and the constant, the maximum bitrates and the minimum bitrates can be calculated prior to starting the process in step S101. Accordingly, the maximum bitrates and the minimum bitrates may be calculated prior to starting the process in step S101, and a corresponding one may be selected from among the calculated bitrates in steps S106 and S108. By doing so, it becomes unnecessary to calculate the maximum bitrates and the minimum bitrates having the same values several times.

Figure 6:
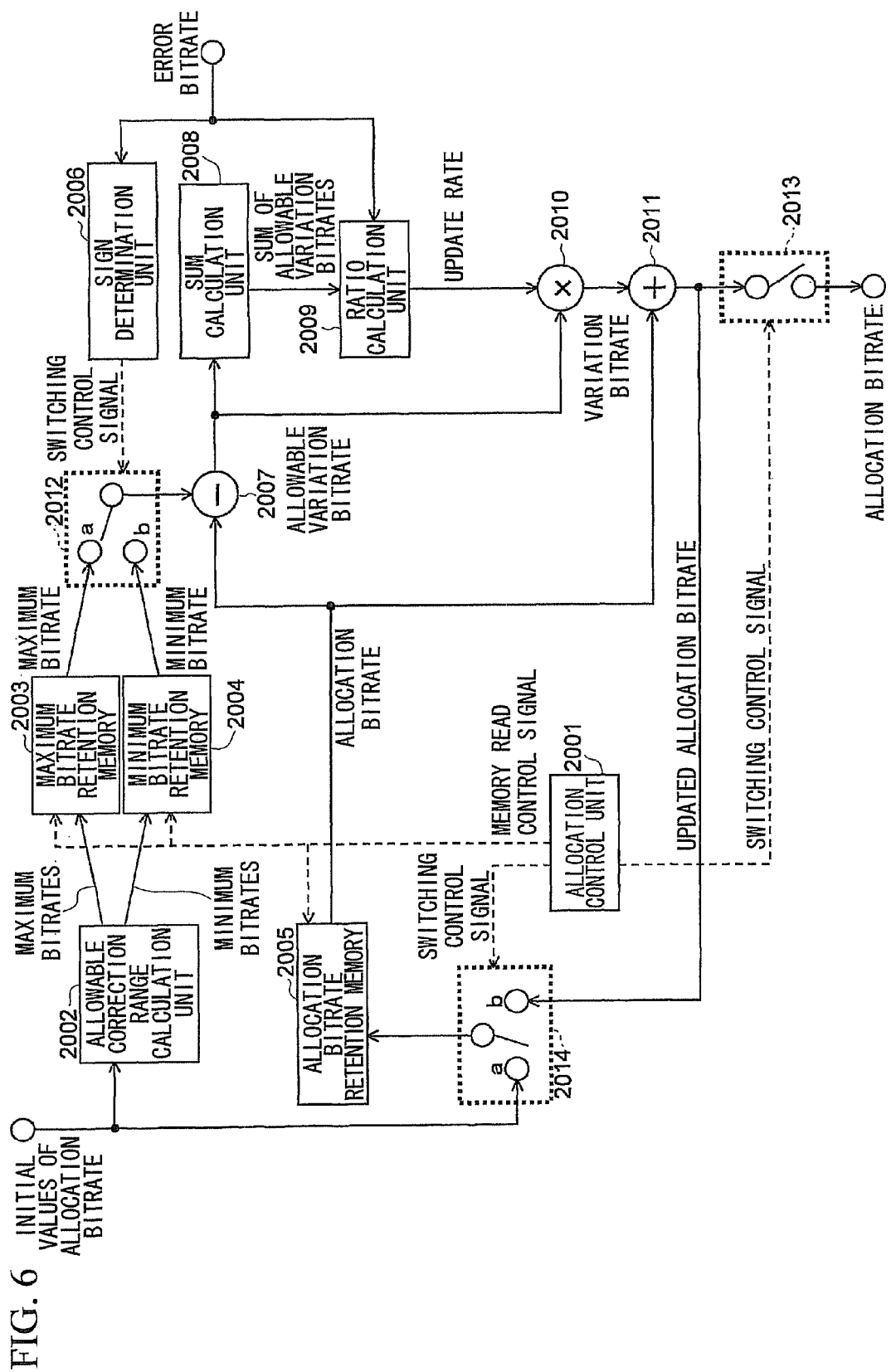
FIG. 6 is a diagram showing an example of an apparatus configuration of the allocation bitrate calculation unit.

FIG. 6 illustrates an example of an apparatus configuration of the allocation bitrate calculation unit 200 that executes the flowchart of FIG. 5.

As shown in FIG. 6, the allocation bitrate calculation unit 200 that executes the process that is characteristic of the present embodiment is provided with an allocation control unit 2001, an allowable correction range calculation unit 2002, a maximum bitrate retention memory 2003, a minimum bitrate retention memory 2004, an allocation bitrate retention memory 2005, a sign determination unit 2006, a subtractor 2007, a sum calculation unit 2008, a ratio calculation unit 2009, a multiplier 2010, an adder 2011, a switch A 2012, a switch B 2013, and a switch C 2014.

This allocation control unit 2001 sends a memory read control signal to the three memories 2003, 2004, and 2005 to control outputs of the respective memories 2003, 2004, and 2005, and controls ON/OFF of the switch B 2013 and switching of the switch C 2014.

The allowable correction range calculation unit 2002 calculates maximum bitrates and minimum bitrates of respective pictures from initial values of allocation bitrates of the respective pictures, and outputs them to the maximum bitrate retention memory 2003 and the minimum bitrate retention memory 2004.

The maximum bitrate retention memory 2003 retains the maximum bitrates of the respective pictures output by the allowable correction range calculation unit 2002. Upon receipt of the memory read control signal from the allocation control unit 2001, the maximum bitrate retention memory 2003 outputs the maximum bitrate corresponding to a designated picture number to the switch A 2012.

The minimum bitrate retention memory 2004 retains the minimum bitrates of the respective pictures output by the allowable correction range calculation unit 2002. Upon receipt of the memory read control signal from the allocation control unit 2001, the minimum bitrate retains memory 2004 outputs the minimum bitrate corresponding to a designated picture number to the switch A 2012.

The allocation bitrate retention memory 2005 retains the allocation bitrates of the respective pictures output by the switch C 2014, and outputs the allocation bitrate corresponding to a designated picture number to the subtractor 2007 and the adder 2011 in accordance with the memory read control signal from the allocation control unit 2001.

The sign determination unit 2006 determines the sign of an error bitrate for a picture that has been encoded, and outputs a switching control signal dependent on the determination result to the switch A 2012 to control the switch A 2012 to select and output the maximum bitrate output by the maximum bitrate retention memory 2003 when the determination result is positive and to control the switch A 2012 to select and output the minimum bitrate output by the minimum bitrate retention memory 2004 when the determination result is negative.

The subtractor 2007 calculates a difference between the maximum bitrate or the minimum bitrate output by the switch A 2012 and the allocation bitrate output by the allocation bitrate retention memory 2005 to calculate an allowable variation bitrate of each picture, and outputs it to the sum calculation unit 2008 and the multiplier 2010.

The sum calculation unit 2008 calculates the sum of the allowable variation bitrates output by the subtractor 2007 to calculate the sum of the allowable variation bitrates of the respective pictures, and outputs it to the ratio calculation unit 2009.

The ratio calculation unit 2009 obtains the ratio of the sum of the allowable variation bitrates output by the sum calculation unit 2008 and the error bitrate of a picture that has been encoded to calculate an update rate, and outputs it to the multiplier 2010.

The multiplier 2010 multiplies the allowable variation bitrate output by the subtractor 2007 by the update rate output by the ratio calculation unit 2009 to calculate a variation bitrate of each picture, and outputs it to the adder 2011.

The adder 2011 adds the allocation bitrate output by the allocation bitrate retention memory 2005 to the variation bitrate output by the multiplier 2010 to obtain an update value of the allocation bitrate of each picture, and outputs it to the switch B 2013 and the switch C 2014.

The switch A 2012 selects one of the maximum bitrate output by the maximum bitrate retention memory 2003 and the minimum bitrate output by the minimum bitrate retention memory 2004 by selecting a terminal a when selecting the maximum bitrate and selecting a terminal b when selecting the minimum bitrate in accordance with the switching control signal from the sign determination unit 2006, and outputs it to the subtractor 2007.

The switch B 2013 outputs the update value of the allocation bitrate output by the adder 2011 to the quantization width calculation unit 105 and the subtractor 103 shown in FIG. 4 in accordance with the switching control signal from the allocation control unit 2001.

The switch C 2014 selects one of an initial value of an allocation bitrate and the update value of the allocation bitrate by selecting a terminal a when selecting the initial value of the allocation bitrate and a terminal b when selecting the updated allocation bitrate output by the adder 2011 in accordance with the switching control signal from the allocation control unit 2001, and outputs it to the allocation bitrate retention memory 2005.

Next, the process executed by the thus configured allocation bitrate calculation unit 200 will be described in detail.

In the allocation bitrate calculation unit 200, when the process is initiated, the initial values of the allocation bitrates are input to the allowable correction range calculation unit 2002, which obtains maximum bitrates and minimum bitrates of first to $N^{th}$ pictures and sends them to the maximum bitrate retention memory 2003 and the minimum bitrate retention memory 2004, respectively. The switching control signal is then sent from the allocation control unit 2001 to the switch C 2014 to switch the switch C 2014 to the terminal a so that the initial values of the allocation bitrates of the first to $N^{th}$ pictures are input to the allocation bitrate retention memory 2005.

On the other hand, the sign determination unit 2006 determines the sign of the input error bitrate and sends the switching control signal to the switch A 2012 to switch the switch A 2012 to the terminal a when the sign is positive and to the terminal b when the sign is negative. Subsequently, the allocation control unit 2001 sends the memory read control signal to the maximum bitrate retention memory 2003, the minimum bitrate retention memory 2004, and the allocation bitrate retention memory 2005, so that respective values of the first to $N^{th}$ pictures retained in the respective memories are output.

The subtractor 2007 then obtains the differences between the outputs, as an allowable variation bitrate, and the sum calculation unit 2008 calculates the sum thereof. The ratio calculation unit 2009 then obtains the update rate from the ratio of the obtained sum of the allowable variation bitrates and the error bitrate.

After the update rate is calculated, the allocation control unit 2001 sends the memory read control signal to the maximum bitrate retention memory 2003, the minimum bitrate retention memory 2004, and the allocation bitrate retention memory 2005 again, so that the respective values of the first to $N^{th}$ pictures retained in the respective memories are output.

The subtractor 2007 then obtains the allowable variation bitrate of each picture from the differences between the output respective values, and the multiplier 2010 calculates the variation bitrate of each picture by multiplying the allowable variation bitrate by the update rate that has been obtained just now. The adder 2011 then adds the obtained variation bitrate of each picture to the allocation bitrate of each picture to calculate an update value of the allocation bitrate of each picture.

The switch C 2014 is then switched to the terminal b by the switching control signal from the allocation control unit 2001, and the obtained update value of the allocation bitrate of each picture is output to the allocation bitrate retention memory 2005, thereby updating the allocation bitrate of each picture.

Finally, the switch B 2013 is turned ON by the switching control signal from the allocation control unit 2001, and the updated allocation bitrate of a next picture is output to the quantization width calculation unit 105 and the subtractor 103 shown in FIG. 4.

In the process for the next picture, when the switch C 2014 is switched to the terminal a, only the initial value of the allocation bitrate of the $(N+1)^{th}$ picture is sent to the allocation bitrate retention memory 2005, and the allocation bitrates of the second to $N^{th}$ pictures remain unchanged.

Next, a process that is characteristic of the present embodiment, which is indicated by a dotted frame in FIG. 5, will be described in association with a block diagram of FIG. 6.

It is assumed that the $n^{th}$ picture has been encoded and the error bitrate thereof has been obtained. In this case, it is assumed that the switch C 2014 is switched to the terminal a.

The sign determination unit 2006 determines the sign of the error bitrate and sends the switching control signal to the switch A 2012 to switch the switch A 2012 to the terminal a when the error bitrate is positive and to the terminal b when the error bitrate is negative.

If the error bitrate is positive, the allowable correction range calculation unit 2002 calculates the maximum bitrates of the $(n+1)^{th}$ and $(n+N)^{th}$ pictures based on the initial values of the allocation bitrates and the constant and stores them in the maximum bitrate retention memory 2003. The subtractor 2007 then calculates the allowable variation bitrates of the $(n+1)^{th}$ and $(n+N)^{th}$ pictures. In this calculation process, the maximum bitrates of the respective pictures are output from the maximum bitrate retention memory 2003 to the subtractor 2007 one at a time in accordance with the memory read control signal from the allocation control unit 2001, and the allocation bitrates of the respective pictures at that time are output from the allocation bitrate retention memory 2005 to the subtractor 2007 one at a time, thereby the allowable variation bitrates are calculated.

On the other hand, if the error bitrate is negative, the allowable correction range calculation unit 2002 calculates the minimum bitrates of the $(n+1)^{th}$ and $(n+N)^{th}$ pictures based on the initial values of the allocation bitrates and the constant, and stores them in the minimum bitrate retention memory 2004. The subtractor 2007 then calculates the allowable variation bitrates of the $(n+1)^{th}$ and $(n+N)^{th}$ pictures. In this calculation process, the minimum bitrates of the respective pictures are output from the minimum bitrate retention memory 2004 to the subtractor 2007 one at a time in accordance with the memory read control signal from the allocation control unit 2001 and allocation bitrates of the respective pictures at that time are output from the allocation bitrate retention memory 2005 to the subtractor 2007 one at a time, thereby the allowable variation bitrates are calculated.

The update rate is then calculated from the ratio of the sum of the allowable variation bitrates and the error bitrate. The sum of the allowable variation bitrates is obtained by the sum calculation unit 2008 summing outputs of the subtractor 2007. The ratio calculation unit 2009 obtains the update rate from this sum and the error bitrate.

The multiplier 2010 then obtains a variation bitrate of each picture. That is, after the update rate is calculated, the memory read control signal is sent from the allocation control unit 2001 to the allocation bitrate retention memory 2005, the maximum bitrate retention memory 2003, and the minimum bitrate retention memory 2004, and the subtractor 2007 calculates the allowable variation bitrate, as in the above description. Then, the multiplier 2010 multiplies this value by the update rate to obtain the variation bitrate of each of the $(n+1)^{th}$ to $(n+N)^{th}$ pictures.

On the other hand, the adder 2011 adds this variation bitrate to the allocation bitrate of each picture output from the allocation bitrate retention memory 2005 to obtain an update value for the allocation bitrate of each picture. The switch C 2014 is then switched to the terminal b by the switching control signal from the allocation control unit 2001, and the allocation bitrate of each picture retained in the allocation bitrate retention memory 2005 is updated with the updated allocation bitrate through overwriting.

The process of the flowchart shown in FIG. 5 can be realized by the configurations shown in FIGS. 4 and 6 described above.

EXAMPLE 1

The present invention will now be described in detail in accordance with an example.

An example to be described below assumes that a maximum value and a minimum value of an allocation bitrate of each picture are respectively obtained as a previously given initial value of the allocation bitrate of each picture multiplied by a constant and a previously given initial value of the allocation bitrate of each picture divided by a constant, respectively. In addition, it is assumed that a function of clipping an update rate to be less than or equal to the maximum value (to be in a given range) is provided. In connection therewith, it is assumed that a function of setting a bitrate that have not been allocated to each picture among the error bitrate as a carry-over bitrate (which may indicate a negative value) and adding it to the error bitrate of the next picture is provided.

Figure 7:
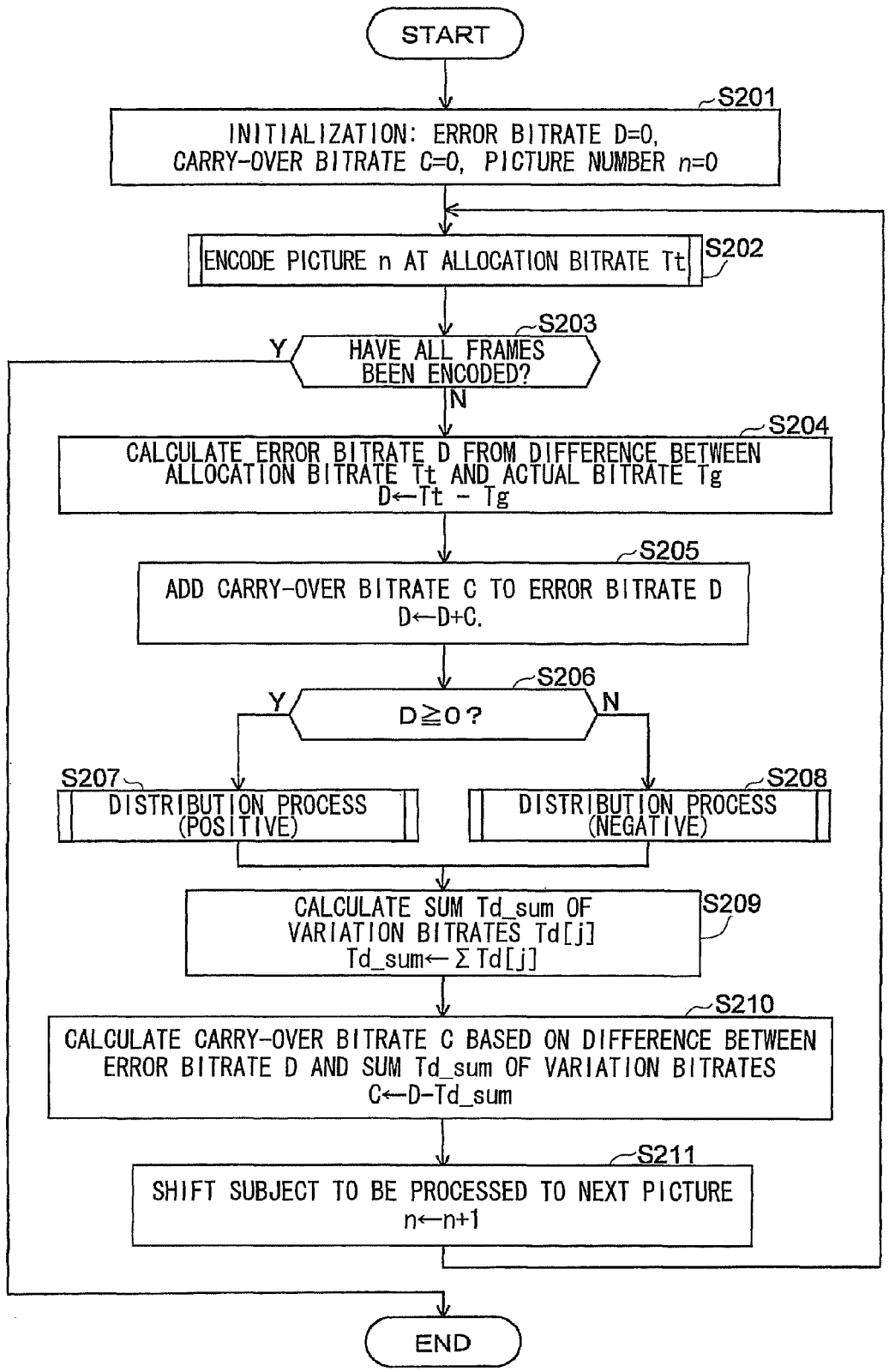
FIG. 7 is a flowchart executed by the allocation bitrate calculation unit.

FIG. 7 shows an example of a flowchart that the allocation bitrate calculation unit 200 executes to realize the present example.

In the present example, when a process is initiated, an error bitrate D, a carry-over bitrate C, and a picture number n are first initialized to 0 as an initialization process in step S201.

In step S202, an $n^{th}$ picture is then encoded at a previously given allocation bitrate. The encoding performed herein is the same as the encoding performed in step S102 of the flowchart of FIG. 5.

In step S203, a determination is then made as to whether or not all frames (all pictures) have been encoded, and if all the frames have been encoded, the process is terminated, and if all the frames have not been encoded, the following processes are executed.

That is, in step S204, the error bitrate D is calculated from a difference between an allocation bitrate Tt and an actually generated bitrate Tg for the $n^{th}$ picture:

$$D \leftarrow Tt - Tg.$$

In step S205, the carry-over bitrate C is then added to the error bitrate D to calculate the error bitrate D to which the carry-over bitrate C is added:

$$D \leftarrow D + C.$$

Figure 8:
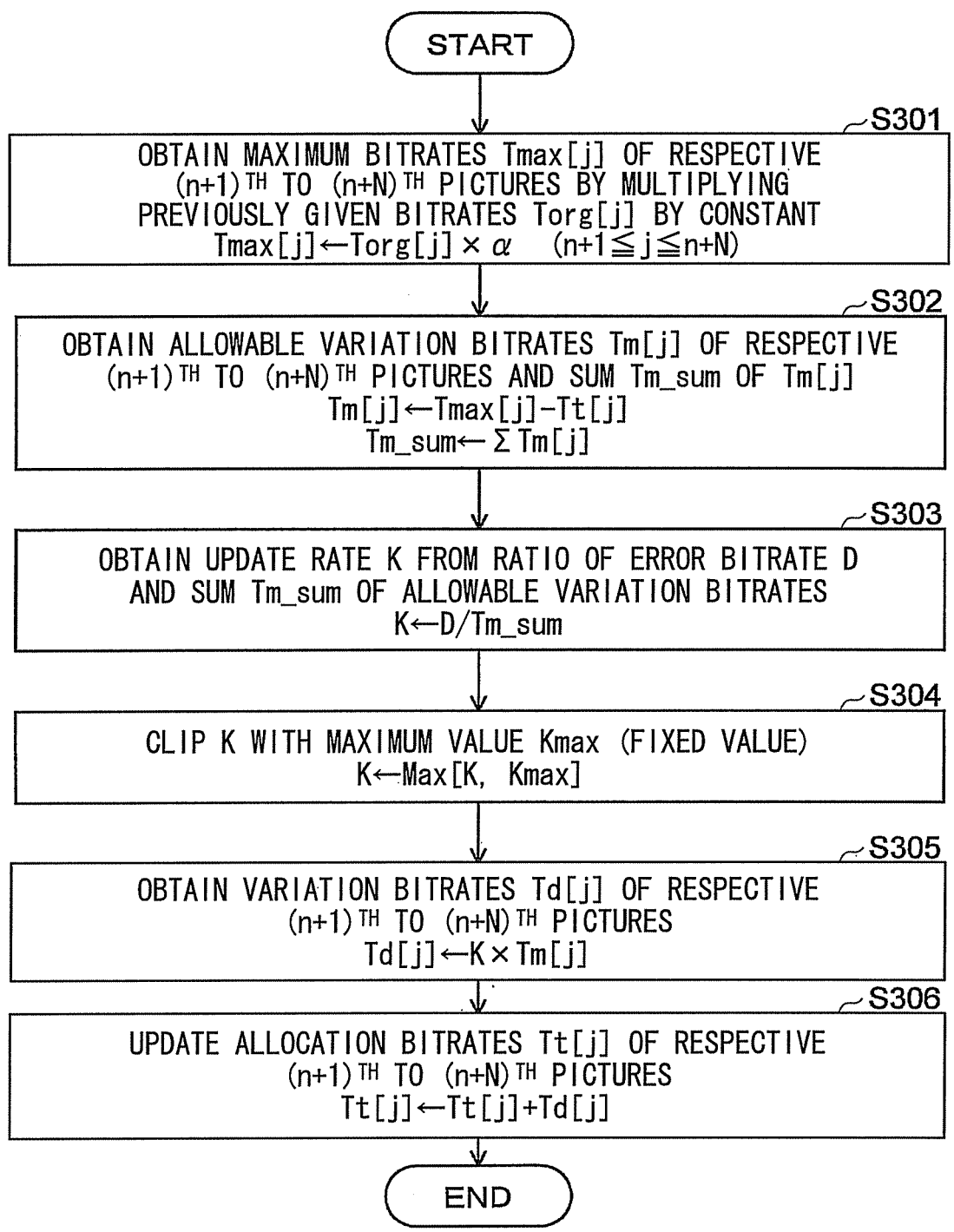
FIG. 8 is a flowchart executed by the allocation bitrate calculation unit.

In step S206, a determination is then made as to whether or not the error bitrate D is greater than or equal to 0, and if it is determined that the error bitrate D is greater than or equal to 0, the flow proceeds to step S207, and a process shown in the flowchart of FIG. 8 is executed.

That is, as shown in the flowchart of FIG. 8, in step S301, maximum bitrates $Tmax[j](n+1 \leq j \leq n+N)$ are first obtained by multiplying previously given bitrates Torg[j] by a constant for the $(n+1)^{th}$ to $(n+N)^{th}$ pictures (N is a predetermined constant greater than 1). When the constant used in the multiplication of the constant is indicated by $\alpha$, $Tmax[j] \leftarrow Torg[j] \times \alpha$ is obtained. Specifically, Torg[j] is an initial value of an allocation bitrate of the $j^{th}$ picture that is set based on the result of the first encoding.

In step S302, allowable variation bitrates Tm[j] and the sum Tm_sum thereof are then obtained for the $(n+1)^{th}$ to $(n+N)^{th}$ pictures. That is, the allowable variation bitrates Tm[j]:

$$Tm[j] \leftarrow Tmax[j] - Tt[j]$$

are calculated based on the maximum bitrates Tmax[j] and the allocation bitrates Tt[j], and the sum Tm_sum thereof:

$$Tm\_sum \leftarrow \Sigma Tm[j]$$

is calculated, where $\Sigma$ is the sum for $n+1 \leq j \leq n+N$.

In step S303, an update rate K:

$$K \leftarrow D/Tm\_sum$$

is then obtained from the ratio of the error bitrate D ($\geq 0$) and the sum Tm_sum ($\geq 0$) of the allowable variation bitrates.

In step S304, the obtained update rate K is then clipped with a maximum value Kmax (a previously given fixed value). That is, $$K \leftarrow Max[K, Kmax]$$

is obtained based on the obtained update rate K and the preset maximum value Kmax.

In step S305, variation bitrates Td[j] are then obtained for the $(n+1)^{th}$ to $(n+N)^{th}$ pictures using the thus obtained update rate K. That is, the variation bitrates Td[j]:

$$Td[j] \leftarrow K \times Tm[j]$$

are calculated based on the update rate K and the allowable variation bitrates Tm[j].

In step S306, the thus obtained variation bitrates Td[j] are then added to the allocation bitrates Tt[j] to update the allocation bitrates Tt[j] for the $(n+1)^{th}$ to $(n+N)^{th}$ pictures, and the process of step S207 in the flowchart of FIG. 7 is terminated. That is, the allocation bitrates Tt[j] are updated as in the following expression:

$$Tt[j] \leftarrow Tt[j] + Td[j]$$

based on the variation bitrates Td[j] and the allocation bitrates Tt[j], and the process of step S207 in the flowchart of FIG. 7 is terminated.

Figure 9:
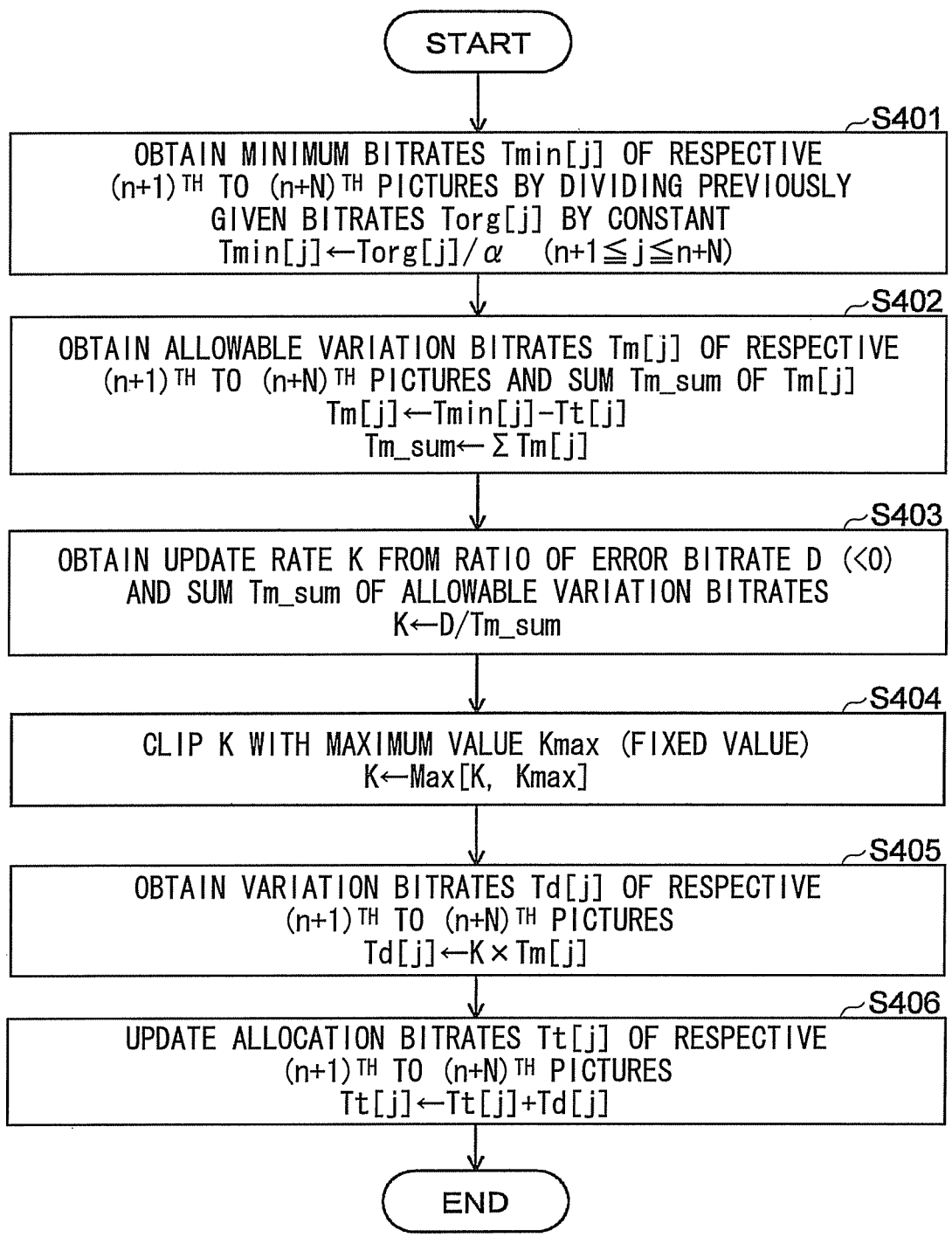
FIG. 9 is a flowchart executed by the allocation bitrate calculation unit.

On the other hand, if it is determined in step S206 of the flowchart of FIG. 7 that the error bitrate D is not greater than or equal to 0, the flow proceeds to step S208, and a process shown in the flowchart of FIG. 9 is executed.

That is, as shown in the flowchart of FIG. 9, in step S401, minimum bitrates Tmin[j](n+1≤j≤n+N) are first obtained by dividing the previously given bitrates Torg[j] by a constant, for the $(n+1)^{th}$ to $(n+N)^{th}$ pictures (N is a predetermined constant greater than 1). That is, if the constant used in the division by the constant is indicated by α, Tmin[j]←Torg[j]/α is obtained. Specifically, Torg[j] is an initial value of the allocation bitrate of the $j^{th}$ picture that is set based on the result of the first encoding. It is noted that the constant used in the division by the constant preferably has the same value (α) as the above-described constant used in the multiplication of the constant, but these two constants are not necessarily the same.

In step S402, an allowable variation bitrates Tm[j] and the sum Tm_sum thereof are then obtained for the $(n+1)^{th}$ to $(n+N)^{th}$ pictures. That is, the allowable variation bitrates Tm[j]:

$$Tm[j] \leftarrow Tmin[j] - Tt[j]$$

are calculated based on the minimum bitrates Tmin[j] and the allocation bitrates Tt[j], and the sum Tm_sum thereof:

$$Tm\_sum \leftarrow \Sigma Tm[j]$$

is calculated, where Σ is the sum for n+1≤j≤n+N.

In step S403, an update rate K $$K \leftarrow D/Tm\_sum$$

is then obtained from the ratio of the error bitrate D (<0) and the sum Tm_sum (<0) of the allowable variation bitrates.

In step S404, the obtained update rate K is then clipped with the maximum value Kmax (a previously given fixed value). That is, $$K \leftarrow Max[K, Kmax]$$

is obtained based on the obtained update rate K and the preset maximum value Kmax.

In step S405, variation bitrates Td[j] are then obtained for the $(n+1)^{th}$ to $(n+N)^{th}$ pictures using the thus obtained update rate K. That is, the variation bitrates Td[j]

$$Td[j] \leftarrow K \times Tm[j]$$

are calculated based on the update rate K and the allowable variation bitrates Tm[j].

In step S406, the thus obtained variation bitrates Td[j] are then added to the allocation bitrates Tt[j] to update the allocation bitrates Tt[j] for the $(n+1)^{th}$ to $(n+N)^{th}$ pictures, and the process in step S208 of the flowchart of FIG. 7 is terminated. That is, the allocation bitrates Tt[j] are updated as in the following equation:

$$Tt[j] \leftarrow Tt[j] + Td[j]$$

based on the variation bitrates Td[j] and the allocation bitrates Tt[j], and the process of step S208 in the flowchart of FIG. 7 is terminated.

In the flowchart of FIG. 7, when the processes in steps S207 and S208 are terminated, in step S209, the sum Td_sum of the variation bitrates Td[j] is then obtained. That is, Td_sum←ΣTd[j] is calculated, where Σ is the sum for n+1≤j≤n+N.

In step S210, a carry-over bitrate C is then calculated from the difference between the error bitrate D and the calculated sum Td_sum of the variation bitrates:

$$C \leftarrow D - Td\_sum.$$

As described above, in step S205, the thus calculated carry-over bitrate C is added to the error bitrate D.

In step S211, a subject to be processed is then shifted to a next picture, the flow returns to the process of step S202, and a process for encoding the next picture at the allocation bitrate Tt is repeatedly performed.

A basic configuration of a video encoding apparatus for realizing the process in the present example is the same as that shown in FIG. 4, but the allocation bitrate calculation unit 200 differs from that shown in FIG. 6, and a new configuration is added to the configuration shown in FIG. 6.

Figure 10:
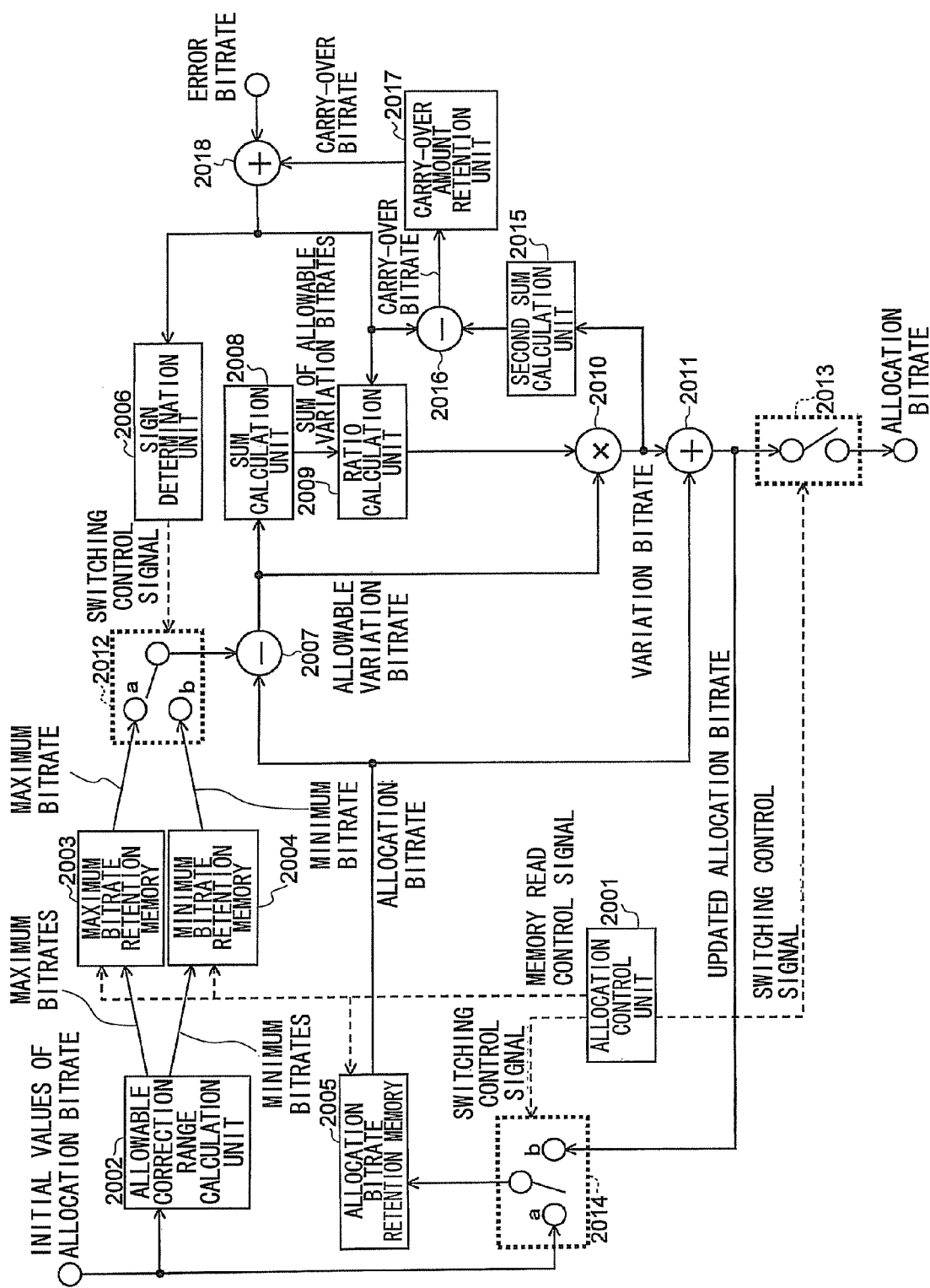
FIG. 10 is a diagram showing an example of an apparatus configuration of the allocation bitrate calculation unit.

FIG. 10 illustrates an example of a configuration of the allocation bitrate calculation unit 200 for realizing the process in the present example.

As shown in FIG. 10, when the process of the present example is realized, the allocation bitrate calculation unit 200 is further provided with a second sum calculation unit 2015, a subtractor 2016, a carry-over amount retention unit 2017, and an adder 2018, in addition to the respective processing means 2001 to 2008 and 2010 to 2014 shown in FIG. 6, and the ratio calculation unit 2009 has a function of clipping the calculated update rate to be less than or equal to the maximum value.

This second sum calculation unit 2015 receives the variation bitrates Td[j] output from the multiplier 2010, calculates the sum Td_sum of the variation bitrates by calculating the sum thereof, and outputs it to the subtractor 2016.

The subtractor 2016 calculates a difference between the error bitrate D and the sum Td_sum of the variation bitrates output by the second sum calculation unit 2015 to calculate the carry-over bitrate C, and outputs it to the carry-over amount retention unit 2017.

The carry-over amount retention unit 2017 retains the carry-over bitrate C output by the subtractor 2016, and outputs the retained carry-over bitrate C to the adder 2018 when the next picture is encoded.

When the next picture is encoded, the adder 2018 adds the carry-over bitrate C output by the carry-over amount retention unit 2017 to the error bitrate D obtained by current encoding to correct the error bitrate D, and outputs it to the sign determination unit 2006, the ratio calculation unit 2009, and the subtractor 2016.

In accordance with the configuration of FIG. 10 described above, the processes in the flowcharts of the present example shown in FIGS. 7 to 9 can be realized.

Next, an experiment conducted to verify the effectiveness of the present invention will be described.

This experiment was conducted by comparing a conventional method with the present invention using the reference software JM 12.1 of the video encoding standard H.264. As an experiment image, the ITE standard image seq07 "European Market" (1440×1080, 450 frames from the head, with subtitles) was used. Moreover, a 2-pass encoding scheme was used as an encoding method, the first encoding was performed with a fixed quantization width, and a half of a generated bitrate of each picture was set as a target bitrate upon second encoding. A quantization parameter (a quantization width represented in a log scale) upon the first encoding was 24 for an I picture, 27 for a P picture, and 30 for a B picture.

An experiment of a conventional method was conducted by adding the error generated every picture to a next picture and by performing encoding. It is noted that the addition was performed on the same type of next picture in consideration of practical use, by, for example, correcting an error of an I picture in a next I picture.

On the other hand, the experiment of the present invention was conducted by performing encoding in accordance with the method described in the example. Here, the maximum bitrate was set as the initial value of the allocation bitrate multiplied by 2, the minimum bitrate was set as the initial value of the allocation bitrate multiplied by ½, and correction was performed over 15 frames (N=15).

Figure 11A:
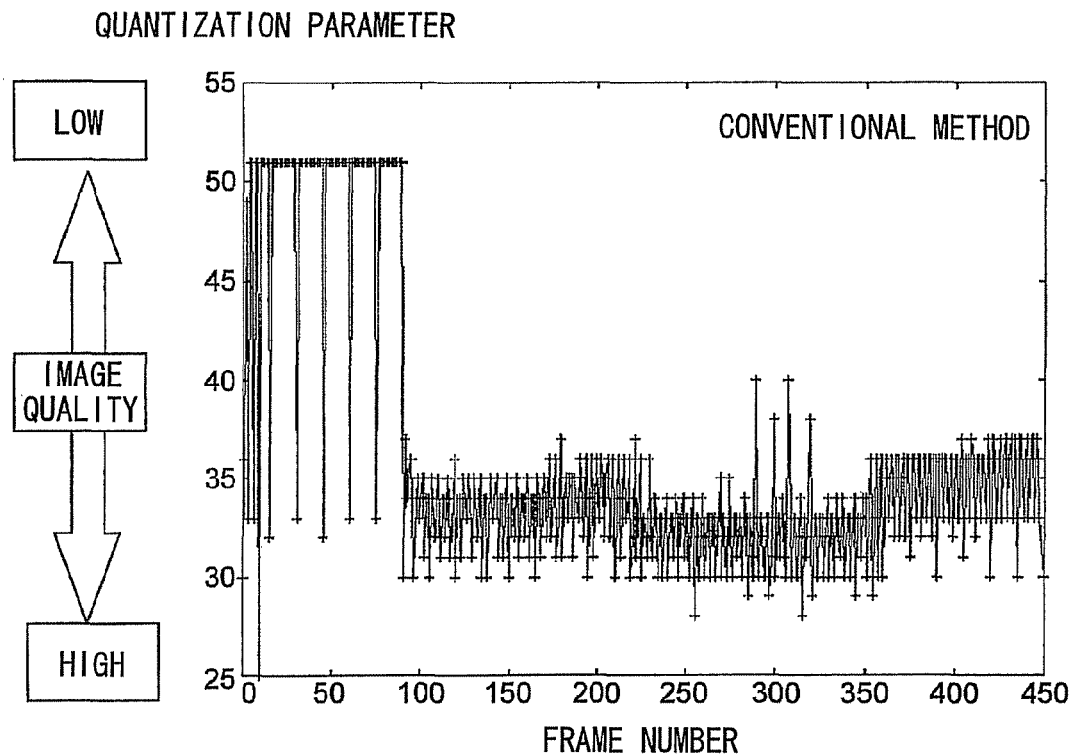
FIG. 11A is an explanatory diagram showing the result of an experiment based on a conventional method performed to verify the effectiveness of the present invention.
Figure 11B:
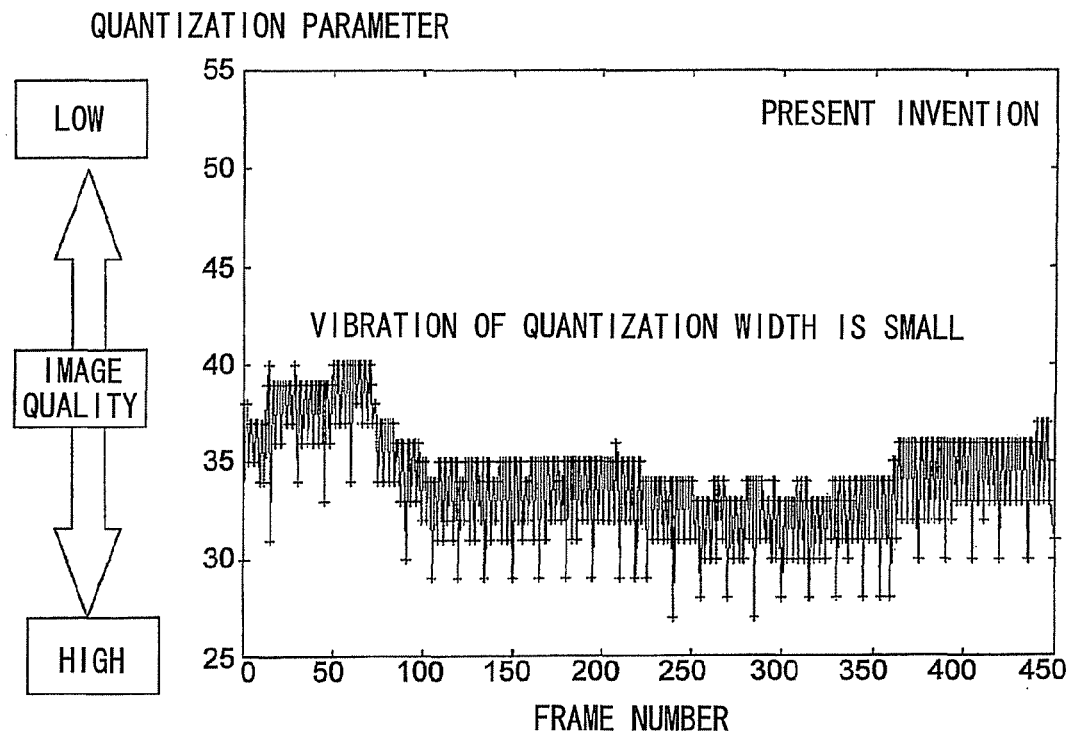
FIG. 11B is an explanatory diagram showing the result of an experiment based on the present invention performed to verify the effectiveness of the present invention.

FIGS. 11A and 11B show results of the present experiment in which a conventional method is compared with the present invention. Here, a horizontal axis indicates a frame number, and a vertical axis indicates a quantization parameter.

It can be seen from the results of this experiment that the present invention provides a small fluctuation of the quantization width and stable image quality. The effectiveness of the present invention could be verified by the results of this experiment.

It is noted that a program for realizing the respective process steps described above may be recorded on a computer-readable recording medium, and the program recorded on the recording medium may be read on a computer system and executed by the computer system to perform the above-described various processes related to the video encoding apparatus.

The computer system referred to herein may include an operating system (OS) and hardware such as peripheral devices. In addition, the computer system may include a homepage providing environment (or displaying environment) when a World Wide Web (WWW) system is used.

The computer-readable recording medium refers to a storage device, including a flexible disk, a magneto-optical disk, a read only memory (ROM), a writable nonvolatile memory such as a flash memory, a portable medium such as a compact disk (CD)-ROM, and a hard disk embedded in the computer system. Furthermore, the computer-readable recording medium may include a medium that holds a program for a constant period of time, like a volatile memory (e.g., dynamic random access memory; DRAM) inside a computer system serving as a server or a client when the program is transmitted via a network such as the Internet or a communication line such as a telephone line.

The foregoing program may be transmitted from a computer system in which this program is stored, for example, in a storage device to another computer system via a transmission medium or by a transmission wave in a transmission medium. Here, the transmission medium that transmits the program refers to a medium having a function of transmitting information, such as a network (communication network) such as the Internet or a communication circuit (communication line) such as a telephone line. Moreover, the foregoing program may be a program for realizing some of the above-described functions. Furthermore, the foregoing program may be a program, i.e., a so-called differential file (differential program), capable of realizing the above-described functions through a combination with a program previously recorded in a computer system.

While the preferred embodiments and examples of the present invention have been described, the present invention is not limited to the above embodiments and examples. Additions, omissions, substitutions, and other variations of the configuration may be made without departing from the gist of the present invention. The present invention is not limited by the above description, but by only the appended claims.

Industrial Applicability

The present invention can be applied to video encoding, and by applying the present invention, when video is encoded at a target bitrate, it is possible to reduce the image quality variation between pictures, so that an improvement in subjective image quality can be realized.

Description of Reference Numerals 101 allocation bitrate storage unit
103 subtractor
104 feature storage unit
105 quantization width calculation unit
106 subtractor
107 DCT unit
108 quantization unit
109 dequantization unit
110 IDCT unit
111 adder
112 decoded image storage buffer
113 predicted image generation unit
114 variable length encoding unit
200 allocation bitrate calculation unit
2001 allocation control unit
2002 allowable correction range calculation unit
2003 maximum bitrate retention memory
2004 minimum bitrate retention memory
2005 allocation bitrate retention memory
2006 sign determination unit
2007 subtractor
2008 sum calculation unit
2009 ratio calculation unit
2010 multiplier
2011 adder
2012 switch A
2013 switch B
2014 switch C

The invention claimed is:

1. A video bitrate control method that controls a generated bitrate of a picture to be encoded based on an initial value of an allocation bitrate that is previously given to each picture, the method comprising:
a step of obtaining a difference between an allocation bitrate and an actually generated bitrate of a picture that has been encoded, as an error bitrate;
a step of selecting, for a plurality of subsequent pictures, one of a maximum value and a minimum value of the allocation bitrate, as an allowable correction range, based on the sign of the error bitrate, the maximum value and the minimum value of the allocation bitrate being calculated from the initial value of the allocation bitrate and a previously given constant;
a step of obtaining, for the plurality of pictures, a difference between the allowable correction range and the allocation bitrate, as an allowable variation bitrate;
a step of obtaining the ratio of the sum of allowable variation bitrates and the error bitrate, as an update rate; and
a step of calculating, for the plurality of pictures, a variation bitrate for the allocation bitrate based on the allowable variation bitrate and the update rate, and updating the allocation bitrate of each of the plurality of pictures based on the variation bitrate.

2. The video bitrate control method according to claim 1, comprising a step of obtaining, for each picture, the maximum value and the minimum value of the allocation bitrate based on the initial value of the allocation bitrate and the constant in advance.

3. The video bitrate control method according to claim 1 or 2, wherein the selecting step selects the maximum value of the allocation bitrate as the allowable correction range when the allocation bitrate is greater than the actually generated bitrate and the error bitrate indicates a positive value, and selects the minimum value of the allocation bitrate as the allowable correction range when the allocation bitrate is less than the actually generated bitrate and the error bitrate indicates a negative value.

4. The video bitrate control method according to claim 1 or 2, comprising:

a step of clipping the update rate to be in a given range;

a step of obtaining a difference between the error bitrate and the sum of variation bitrates, as a carry-over bitrate; and a step of adding the carry-over bitrate to the error bitrate obtained upon encoding of a next picture.

5. The video bitrate control method according to claim 1 or 2, wherein the update rate is common to the plurality of pictures.

6. A video bitrate control apparatus that controls a generated bitrate of a picture to be encoded based on an initial value of an allocation bitrate that is previously given to each picture, the apparatus comprising:

a unit which obtains a difference between an allocation bitrate and an actually generated bitrate of a picture that has been encoded, as an error bitrate;

a unit which selects, for a plurality of subsequent pictures, one of a maximum value and a minimum value of the allocation bitrate, as an allowable correction range, based on the sign of the error bitrate, the maximum value and the minimum value of the allocation bitrate being calculated from the initial value of the allocation bitrate and a previously given constant;

a unit which obtains, for the plurality of pictures, a difference between the allowable correction range and the allocation bitrate, as an allowable variation bitrate;

a unit which obtains the ratio of the sum of allowable variation bitrates and the error bitrate, as an update rate; and a unit which calculates, for the plurality of pictures, a variation bitrate for the allocation bitrate based on the allowable variation bitrate and the update rate, and updates the allocation bitrate of each of the plurality of pictures based on the variation bitrate.

7. The video bitrate control apparatus according to claim 6, comprising a unit which obtains, for each picture, the maximum value and the minimum value of the allocation bitrate based on the initial value of the allocation bitrate and the constant in advance.

8. The video bitrate control apparatus according to claim 6 or 7, wherein the selecting unit selects the maximum value of the allocation bitrate as the allowable correction range when the allocation bitrate is greater than the actually generated bitrate and the error bitrate indicates a positive value, and selects the minimum value of the allocation bitrate as the allowable correction range when the allocation bitrate is less than the actually generated bitrate and the error bitrate indicates a negative value.

9. The video bitrate control apparatus according to claim 6 or 7, comprising:

a unit which clips the update rate to be in a given range;

a unit which obtains a difference between the error bitrate and the sum of variation bitrates as a carry-over bitrate; and a unit which adds the carry-over bitrate to the error bitrate obtained upon encoding of a next picture.

10. The video bitrate control apparatus according to claim 6 or 7, wherein the update rate is common to the plurality of pictures.

11. A non-transitory computer-readable recording medium having a video bitrate control program recorded thereon for causing a computer to execute the video bitrate control method according to claim 1 or 2.

* * * * *